(12) United States Patent
Davies et al.

(10) Patent No.: US 7,571,166 B1
(45) Date of Patent: Aug. 4, 2009

(54) VIRTUAL PRIVATE SUPPLY CHAIN

(75) Inventors: John Merrow Davies, Costa Mesa, CA (US); Gary Casamento, Huntington Beach, CA (US); Mahendra Kumar, Sunnyvale, CA (US); Thomas J. Hilferty, Huntington Valley, PA (US); Lisayani Tejolesmono, Cerritos, CA (US); Frank E. Orchard, Elmsford, NY (US); Lawrence Flon, Costa Mesa, CA (US); Michael Gary Anderson, Charlotte, NC (US); Leslie Casamento, Huntington Beach, CA (US)

(73) Assignee: Click Acquisitions, Inc., El Segundo, CA (US)

( * ) Notice: Subject to any disclaimer, the term of this patent is extended or adjusted under 35 U.S.C. 154(b) by 753 days.

(21) Appl. No.: 09/998,613

(22) Filed: Nov. 30, 2001

Related U.S. Application Data

(60) Provisional application No. 60/299,253, filed on Jun. 19, 2001.

(51) Int. Cl.
*G06F 17/30* (2006.01)
(52) U.S. Cl. ............... 707/10; 707/104.1; 707/200; 709/203
(58) Field of Classification Search ............ 709/203, 709/205, 225, 221; 707/9, 10, 200, 2, 6, 707/100, 104.1; 705/2, 7, 26, 28
See application file for complete search history.

(56) References Cited

U.S. PATENT DOCUMENTS

| 5,155,847 | A | * | 10/1992 | Kirouac et al. ............ 709/221 |
| 5,285,392 | A | * | 2/1994 | Kyle et al. ................ 700/100 |
| 5,694,551 | A | * | 12/1997 | Doyle et al. ............... 705/26 |
| 5,884,300 | A | * | 3/1999 | Brockman .................. 707/2 |
| 5,946,662 | A | * | 8/1999 | Ettl et al. .................. 705/8 |
| 6,115,690 | A | * | 9/2000 | Wong ........................ 705/7 |
| 6,119,149 | A | * | 9/2000 | Notani ..................... 709/205 |
| 6,343,275 | B1 | * | 1/2002 | Wong ....................... 707/10 |
| 6,463,345 | B1 | * | 10/2002 | Peachey-Kountz et al. ... 700/99 |
| 6,708,166 | B1 | * | 3/2004 | Dysart et al. .............. 707/6 |
| 2002/0138316 | A1 | | 9/2002 | Katz et al. |
| 2002/0138358 | A1 | | 9/2002 | Scheer |

* cited by examiner

*Primary Examiner*—Shahid A Alam
(74) *Attorney, Agent, or Firm*—Pepper Hamilton LLP

(57) ABSTRACT

A generic Internet based system for viewing supply chain data is provided. The system includes an Internet based data viewing engine and a data store that holds both viewable data and metadata associated with the viewable data. The metadata can be employed by the Internet based data viewing engine to control the presentation of the viewable data. The generic Internet based supply chain data viewing engine may be employed in a virtual private supply chain (VPSC). A VPSC includes a data acceptor that can receive supply chain data items from supply chain members, a supply chain data store that can store transformed, validated supply chain data items received from the supply chain members and a data accessor operable to selectively present supply chain data items stored in the supply chain data store to viewing supply chain members. One example of the data accessor is the generic Internet based viewing engine.

20 Claims, 18 Drawing Sheets

VIRTUAL PRIVATE SUPPLY CHAIN

CROSS-REFERENCE TO RELATED APPLICATIONS

This application claims the benefit of U.S. Provisional Application Ser. No. 60/299,253 entitled SYSTEM AND METHOD FOR COLLABORATIVE SUPPLY CHAIN PROCESSING, filed on Jun. 19, 2001.

TECHNICAL FIELD

The present invention generally relates to a system, schema and/or method for collaborative supply chain data processing, and more particularly, to producing virtual private supply chains and viewing supply chain data via a generic Internet based viewing engine.

BACKGROUND

In traditional supply chains, material trickles downstream sequentially while data sequentially moves back upstream. With information latency between the touch points in such a supply chain, excess inventory may pile up at points along a supply chain as buffers against supply and demand forecasts that may not be accurate. Such inventory carrying costs reduce profits and increase order-to-delivery and cash-to-cash cycles. Furthermore, disconnections between inventory flow and information concerning that inventory flow exacerbate problems associated with proactively managing inventory in real-time or near real-time.

A supply chain may include multiple enterprises that need to communicate and cooperate to insure that goods and/or services are moved from suppliers to consumers in a timely, efficient manner. Conventionally, supply chain data is stored in a series of databases that are individually owned, controlled and/or designed. Users of such supply chain databases typically custom craft display screens (e.g., browser based user interfaces) and/or hard copy formats to correspond to their understanding of the database(s) and their desired outputs. Such custom crafted screens and/or printouts may rely on an incomplete and/or incorrect understanding of the data in the database(s). Furthermore, such custom crafted display solutions may be difficult to program, even more difficult to reprogram, and even more difficult still to integrate with other custom crafted display solutions and databases, due, for example, to inconsistent formats between supply chain member data.

Conventionally, an enterprise may be a member of many supply chains. For example, a widget producer may ship widgets to a variety of sources including widget assemblers, widget customizers, widget testers, widget wholesalers, widget retailers and widget consumers. Furthermore, a widget may arrive at its ultimate destination after transiting multiple supply chains. For example, a first widget consumer may receive a widget directly from a widget producer, a second widget consumer may receive a widget via a widget retailer who received it from a widget wholesaler, and a third widget consumer may receive a widget via a widget customizer and widget tester. Different points in different supply chains may employ different forms, data and/or customs to achieve delivery and facilitate record keeping. Thus, one widget supplier may have to maintain multiple supply chain protocols, forms and/or records to communicate with members of the various supply chains of which it is a member. This increases supply chain data processing complexity and thus reduces efficiency in supply chain operations. As contract manufacturing, dedicated suppliers and vendor managed inventories increase, such data processing problems are exacerbated due to the expanding network of enterprises included in a supply chain.

Conventionally, members of a supply chain keep individual records concerning their enterprises. By way of illustration, a supply chain member may keep records concerning items including, but not limited to, purchase orders sent, purchase orders received, inventory, sales orders sent, sales orders received, warehouse orders, shipments, and the like. Such records may be stored in one or more individually owned, controlled and/or designed databases and may be stored in inconsistent formats. Typically, due to security concerns, supply chain members do not open their databases to access from other supply chain members. Thus, to communicate with other supply chain members it has been customary to exchange EDI (Electronic Data Interchange) data and/or paper printouts. Producing, shipping and interpreting both EDI and paper printouts introduces delays and potential points of confusion into supply chain processing. Furthermore, EDI and/or paper employed in one supply chain may not be interchangeable with other supply chains, creating additional complexity in supply chain data processing.

Conventionally, supply chain members deploy inventory between facilities based on projections concerning supply and demand. Such projections may be based on models that account for a number of factors including historical demand, historical supply, phoned in updates and inventory manager intuition. However, such projections become stale as soon as they are issued since they do not rely on the actual inventory, supply and/or demand situation at facilities. The projections grow increasingly more stale as a reporting period progresses. For example, a report generated for a one month long reporting cycle may initially be acceptable. However, changing conditions in the field (e.g., warehouse fire, run on supply at a location, work action slowdown) may make the report unacceptably inaccurate. Typically, there were limited, if any, means to adapt inventory distributions within a reporting cycle.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides a system, schema and/or method for collaborative supply chain data processing, and more particularly, to producing virtual private supply chains and viewing supply chain data via a generic Internet based viewing engine. Furthermore, the present invention facilitates achieving supply chain transparency, which enables enterprises to securely share order and inventory information among trading partners.

The present invention employs a supply chain data store that stores supply chain data in one or more common schemas and which also stores metadata (data about data), which facilitates viewing data in the data store in an Internet environment using a generic display engine. The generic Internet based display engine facilitates providing a data driven display that displays data pursuant to metadata concerning what data should be displayed and how that data should be displayed.

In one example of the present invention, supply chain row-level security that lessens supply chain enterprise security problems is provided. The supply chain row-level security begins with enterprises pushing selected data across their security measures (e.g., firewalls). The pushed data can then be validated, reformatted and loaded into a central database, where it can be selectively shared based on access rights of other enterprises.

The present invention provides a system, method and/or schema to facilitate collaborative, real-time exchange of supply chain data between multiple enterprises, which in turn facilitates reducing complexity and/or delays in supply chain processing. Such collaborative processing can be employed to produce a virtual private supply chain (VPSC). A VPSC is a conduit through which supply chain data can flow in a timely, secure, consistent manner.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Prior Art

Prior Art

FIG. 11 is a sample screen shot illustrating an output produced by a generic Internet based viewing engine, in accordance with an aspect of the present invention.

DETAILED DESCRIPTION OF THE INVENTION

Figure 1:
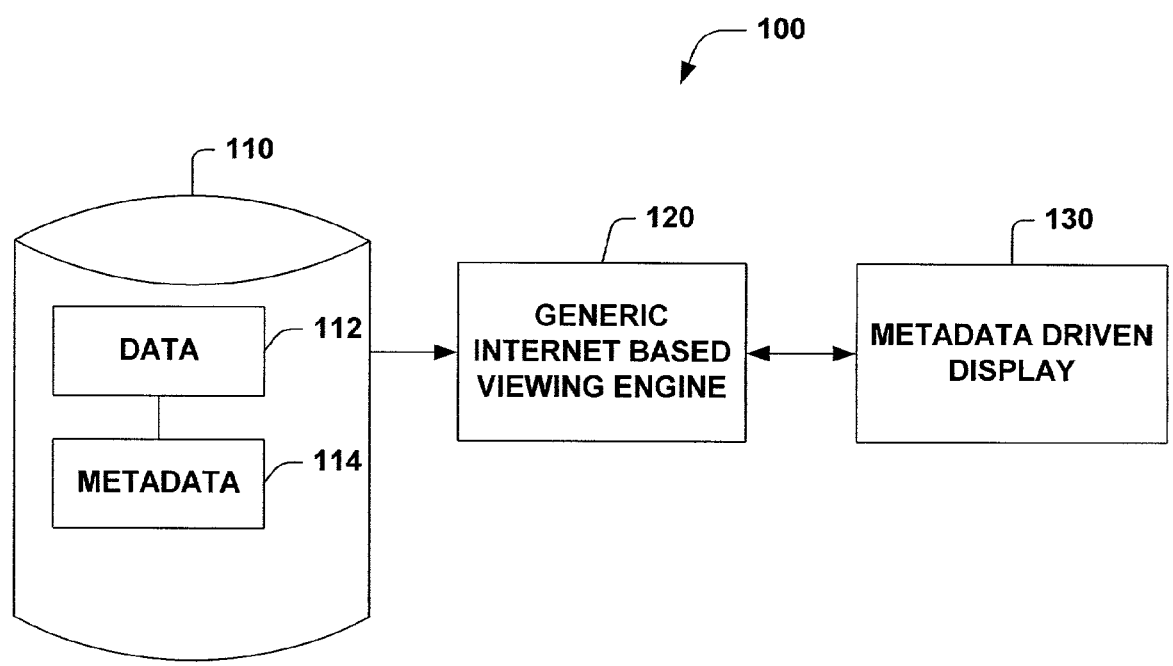
FIG. 1 is a schematic block diagram illustrating a generic Internet based viewing engine, in accordance with an aspect of the present invention.

The present invention is now described with reference to the drawings, where like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component.

Extraction is a process by which data is retrieved from a data source and placed in a central staging environment where it may be further processed (e.g., transformed, validated). There are different types of extractions (e.g., partial, full, change-driven). Transformation is a process that cleans incorrect data, resolves missing elements, ensures conformance to standards, purges unnecessary fields, combines data where appropriate, creates surrogate keys to avoid dependence on source system keys and builds aggregate and summary information where required, and the like. Loading is a process in which transformed data is loaded into a data store and during which indices for dimensions in the data store are created.

A key is a value that identifies a record in a database. The collection of keys for records in a database form an index. A primary key is a key that is selected to facilitate identifying an entity, object, or record. A foreign key is an attribute within a database record that uniquely identifies another record, therefore serving as a reference from one record to another.

It is to be appreciated that various aspects of the present invention may employ technologies associated with facilitating unconstrained optimization and/or minimization of error costs. Thus, non-linear training systems/methodologies (e.g., back propagation, Bayesian, fuzzy sets, non-linear regression, or other neural networking paradigms including mixture of experts, cerebella model arithmetic computer (CMACS), radial basis functions, directed search networks and function link networks) may be employed with the present invention.

Referring now to FIG. 1, a system 100 that includes a generic Internet based viewing engine 120 that facilitates multi-enterprise visibility to supply chain data is illustrated. The generic Internet based viewing engine 120 produces a metadata driven display 130, where the data that is displayed is controlled by metadata associated with the displayed data. Thus, the system 100 includes a data store 110 where data 112 and metadata 114 associated with the data 112 is stored. By providing data 112 and metadata 114 in a format consistent with that expected by the generic Internet based viewing engine 120, the creator and/or designer of the data and/or schema can participate in controlling the method in which the data 112 is displayed. Thus, problems associated with programming and/or reprogramming custom crafted display screens are mitigated, since the viewer of the data 112 does not need to program the display.

While a single data store 110 is illustrated, it is to be appreciated that the data 112 and/or metadata 114 may be stored in one or more standalone and/or distributed, co-operating data stores. The data stores may include, but are not limited to, databases, hypercubes, tables, spreadsheets, files, arrays, queues, stacks, heaps, lists, linked lists, neural networks, semantic maps and graphs.

In one example of the present invention, the data 112 is supply chain data and the metadata 114 includes, but is not limited to metadata concerning query criteria, view headings, additional information links, view results, personalization parameters, display content, display layout and display format. While the generic Internet based viewing engine 120 facilitates producing a metadata driven display 130, a user of the generic Internet based viewing engine 120 may produce and store personalization preferences concerning the data 112. Thus the metadata 114 may be supplemented by users of the data 112. In one example of the present invention, the generic Internet based viewing engine 120 provides a presentation interface and/or data navigator that facilitates a user of the generic Internet based viewing engine 120 selecting the content, layout and/or format of the metadata driven display 130, further mitigating problems associated with (re)programming custom crafted displays in conventional systems.

Figure 11:
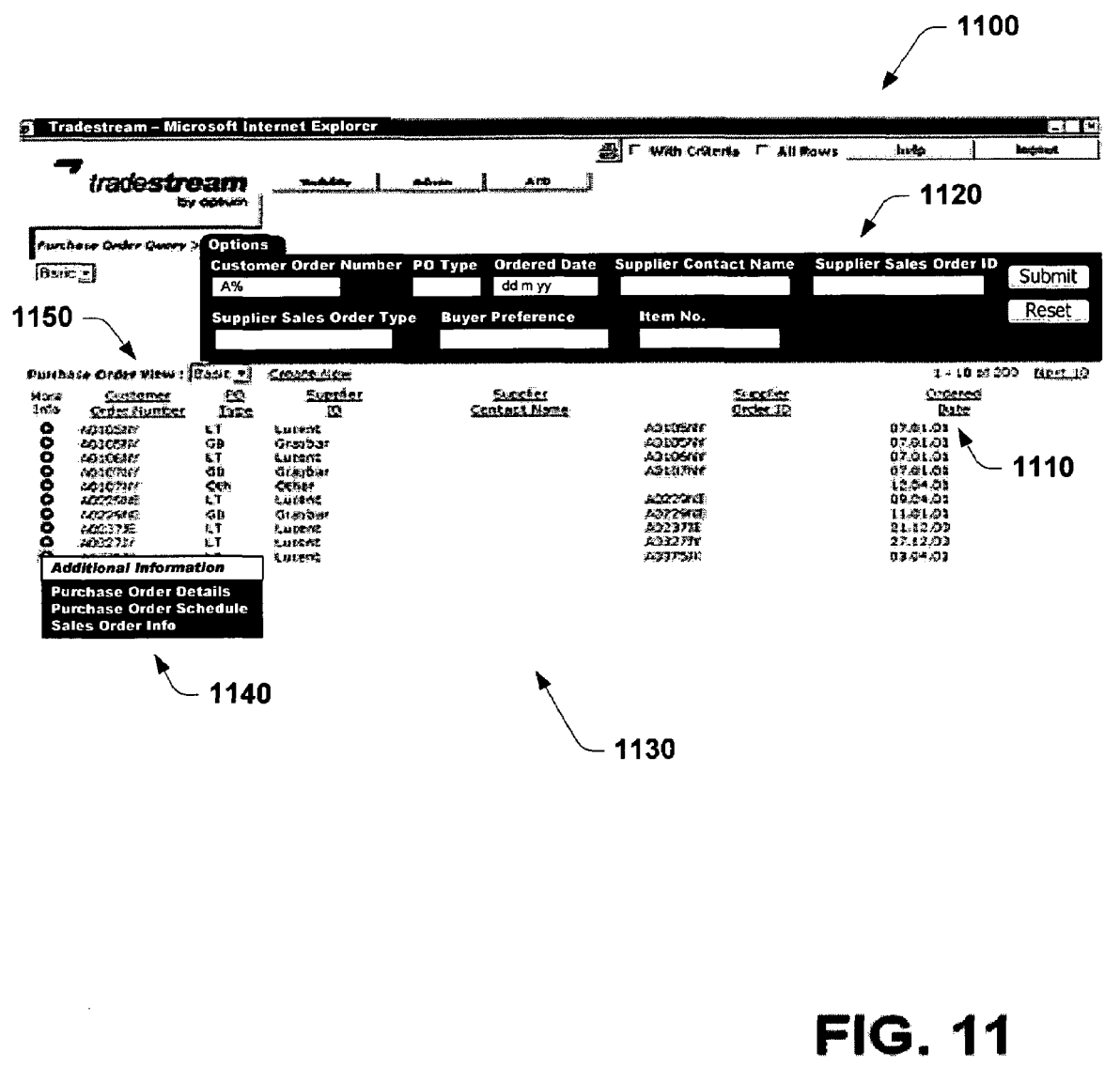

While the generic Internet based viewing engine 120 is illustrated as a single block in FIG. 1, it is to be appreciated that the generic Internet based viewing engine 120 may include one or more components, and that the generic Internet based viewing engine 120 may be run on a single computer or in a single process and/or distributed across two or more computers and/or processes. A sample screen associated with a user interface employed by one example generic Internet based viewing engine 120 is illustrated in FIG. 11.

Figure 2:
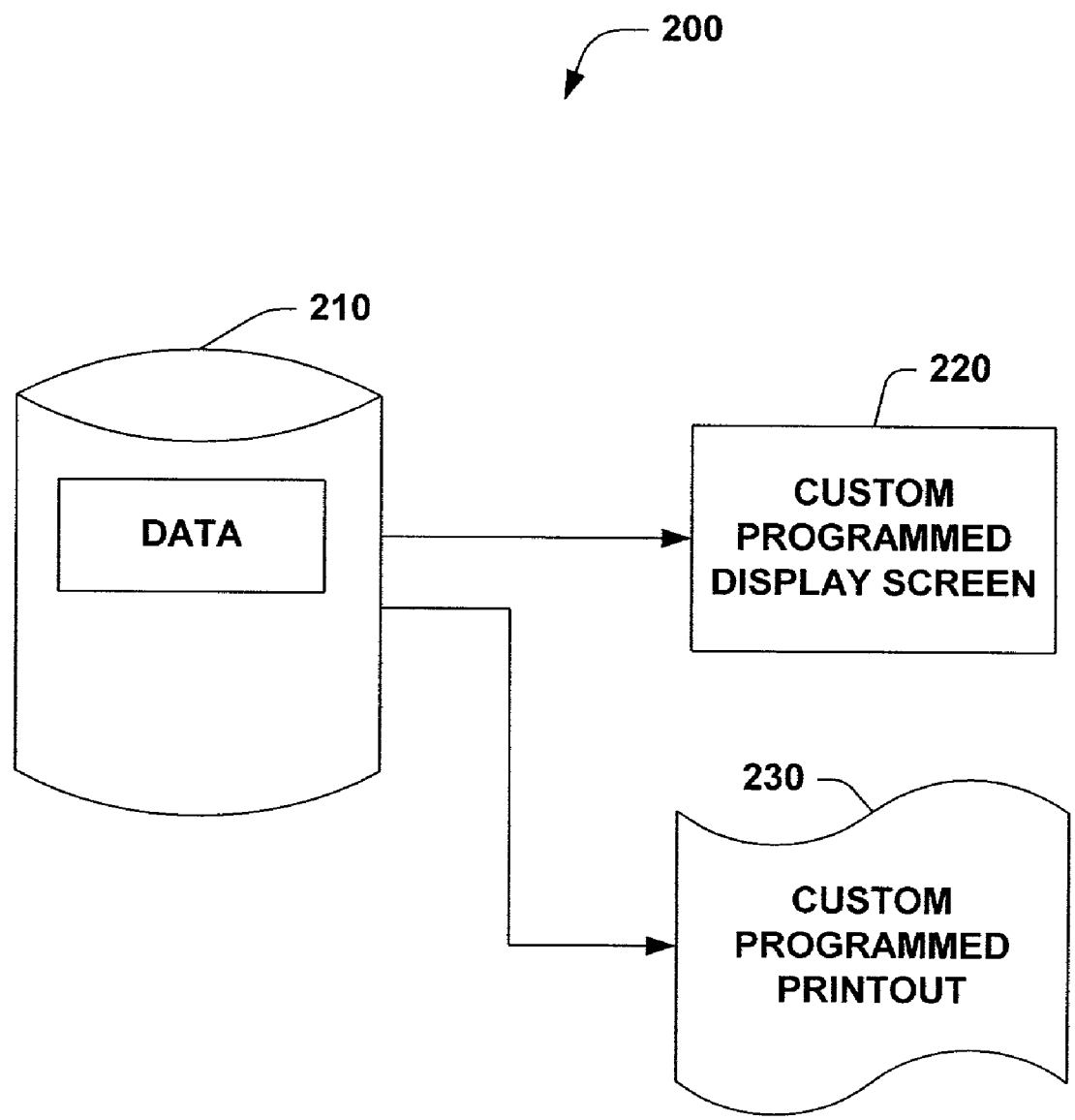
FIG. 2 is a schematic block diagram illustrating conventional custom programmed outputs.

Prior Art FIG. 2 illustrates a conventional system 200 where custom programmed outputs (e.g., a custom programmed display screen 220, a custom programmed printout 230) are produced from proprietary data 210. Conventionally, each member of a supply chain would own and/or control its own supply chain data. Thus, each member of a supply chain would custom program its own displays and/or printouts. Such proprietary data stores, custom programmed displays and/or printouts were typically inconsistent between supply chain members, which made integrating data, displays and/or printouts between supply members more difficult, which increased complexity and thus cost in integrating supply chain members. Furthermore, when a supply chain member with a custom programmed display screen 220 and/or a custom programmed printout 230 decided to change the data 210 from which the screen 220 and/or printout 230 was programmed, this typically involved reprogramming the program(s) that produced the screen 220 and/or the printout 230. Conventional systems therefore suffered from problems associated with reprogramming legacy code and with inflexible data storage and display systems. The present invention, by associating metadata with supply chain data, facilitates producing the generic Internet based viewing engine 120 (FIG. 1), which mitigates problems associated with custom crafting outputs (e.g., screens, printouts), by making such outputs data driven, rather than process (e.g., computer program) driven.

Conventionally, application developers and/or screen users would examine a database (and/or its schema) from which screen data could be acquired and displayed and then lay out their own screens to conform to the available data and their design criteria. With the present invention, a database user can provide metadata that facilitates the generic, Internet based display engine 120 (FIG. 1) adapting itself to a database structure that is not known in advance and through the use of such metadata, rather than via reprogramming, to display data from the database in a meaningful manner. Thus, by employing the metadata schema and the generic Internet based display engine (FIG. 1), (re)programming costs associated with viewing supply chain database data may be reduced. By way of illustration, a user may provide metadata that describes which fields from a database are to be displayed, and which fields are to remain invisible. By way of further illustration, query statements (e.g., SQL queries) can be dynamically constructed based on data retrieved from the metadata associated with the database. Such dynamically constructed queries may be employed to generate dynamic view results. By way of still further illustration, additional information anchors can be dynamically determined from the presence of related data in other interfaces for rows returned in view results. Thus, users may perform actions including, but not limited to, querying a database, displaying results and navigating from table to table through record relationships stored in the metadata.

Figure 3:
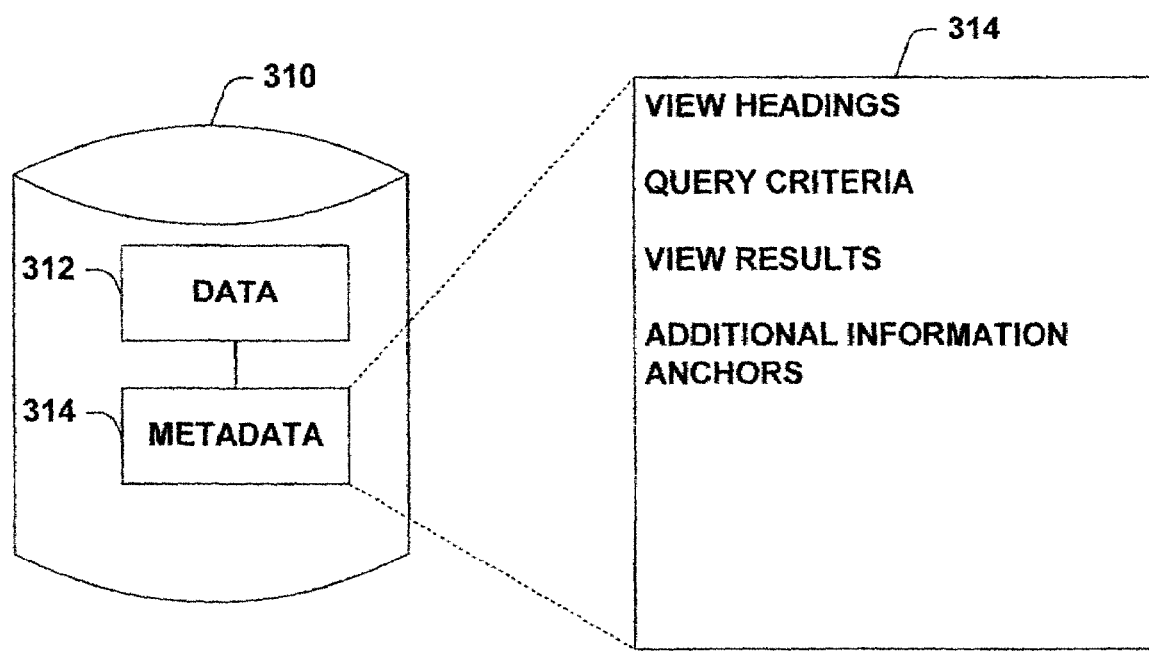
FIG. 3 is a schematic block diagram illustrating a data store organization that facilitates producing the generic Internet based viewing engine of FIG. 1, in accordance with an aspect of the present invention.

FIG. 3 illustrates a data store 310 that facilitates producing the generic Internet based viewing engine 120 (FIG. 1). The data store 310 includes supply chain data 312 and metadata 314 concerning the supply chain data 312. While a single data store 310 is illustrated, it is to be appreciated that the data 312 and/or metadata 314 may be stored in one or more standalone and/or distributed, co-operating data stores. The data stores may include, but are not limited to, databases, hypercubes, tables, spreadsheets, files, arrays, queues, stacks, heaps, lists, linked lists, neural networks, semantic maps and graphs.

In one example of the present invention, the metadata 314 includes information concerning view headings, query criteria, view results and additional information anchors. The view results may be based on dynamically created SQL statements that are constructed from column names in view headings. Similarly, the additional information anchors may be dynamically determined from the presence of related data in other interfaces for the rows returned in the view results.

Figure 4:
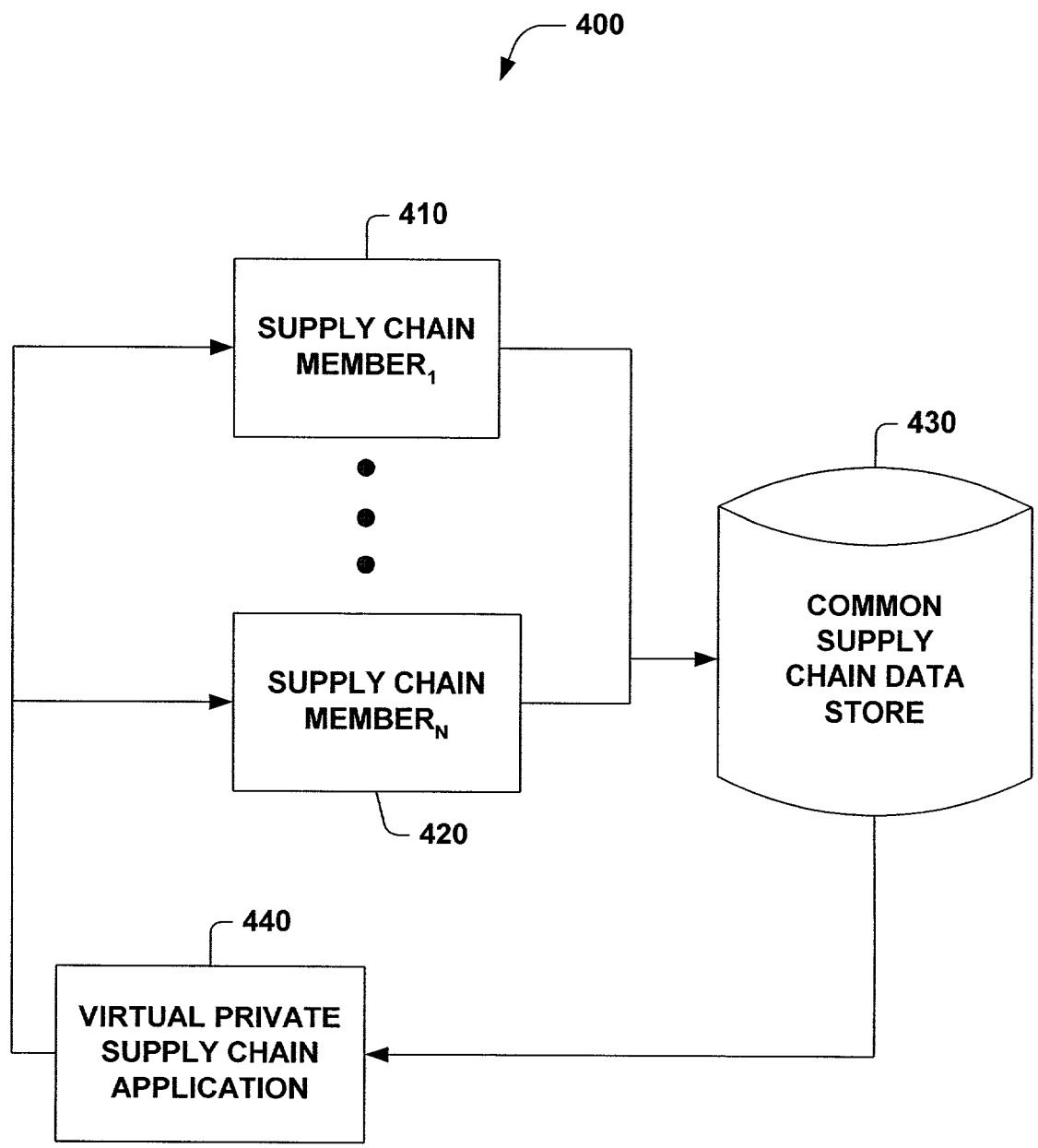
FIG. 4 is a schematic block diagram illustrating a virtual private supply chain, in accordance with an aspect of the present invention.

FIG. 4 illustrates a system 400 for providing a virtual private supply chain. The system 400 includes a common supply chain data store 430 into which one or more supply chain members (e.g., SUPPLY CHAIN MEMBER$_1$ 410 through SUPPLY CHAIN MEMBER$_N$ 420, N being an integer) deposit supply chain information (e.g., inventory positions, production capacity, purchase orders, sales orders, warehouse orders, etc.). While a single data store 430 is illustrated, it is to be appreciated that the data store 430 may be implemented in one or more standalone and/or distributed, co-operating data stores. The data stores may include, but are not limited to, databases, hypercubes, tables, spreadsheets, files, arrays, queues, stacks, heaps, lists, linked lists, neural networks, semantic maps and graphs.

Data may be extracted (e.g., pushed, pulled) from the supply chain members to the common supply chain data store 430 and thus the common supply chain data store 430 and/or related processes do not need to reach through security measures (e.g., firewalls) associated with supply chain member data stores. The extraction may occur at times including, but not limited to, on a periodic basis, on a manual trigger and on a data update trigger. The common supply chain data store 430 and/or associated processes can transform the supply chain data, which may be in inconsistent formats, to one or more common formats based on one or more common schema. Furthermore the common supply chain data store 430 and/or associated processes can validate the supply chain data before loading it into the common supply chain data store 430. Further still, the common supply chain data store 430 and/or associated processes can determine relationships between supply chain member data and control access to such related data. For example, a purchase order from a first supply chain member may be related to inventory position information from a second supply chain member and a sales order from the second supply chain member. Thus, in addition to the first supply chain member being able to view their own data stored in the common supply chain data store 430, the first supply chain member may be able to view related data (e.g., inventory position, sales order, shipping information) given proper access permissions. Thus, integration between suppliers and consumers is facilitated, which provides real and/or pseudo real-time viewing of data including, but not limited to, inventory data and order fulfillment data, providing advantages over conventional systems where such integrated viewing is not possible.

Security is improved from an all or nothing approach (e.g., Enterprise B can see all the data of Enterprise A), to a supply chain row-level approach through the use of techniques including, but not limited to, secure socket layers (SSL), digital certificates and encryption. For example, in the present invention, an enterprise may be able to see their own data and may also be able to see data from other enterprises when they have necessary access rights, which can change dynamically (e.g., from Purchase Order (PO) to PO). For example, Enterprise A may be able to see rows on Enterprise B's PO because B ordered from A, but A cannot see other rows on the PO that do not relate to A. Furthermore, A may not be allowed to see any of B's second PO, or even become aware of the second PO because it does not relate to A, (e.g., it may go to C, A's competitor).

In one example of the present invention, the proprietary data of many enterprises is stored in a single set of database tables. To secure that data, protection is provided at multiple levels of access to so that an enterprise may only see the data of another enterprise with specific authorization by the owning enterprise. Thus, the present invention implements both intra-enterprise and inter-enterprise security. Such security may be implemented, for example, using supply chain row-level access control, which attaches a policy to each table where row level security is required. "Where" clauses are embedded into query statements (e.g., SQL statements) issued against a table with a policy, where the "where" clause is determined at the time the statement is executed by firing a trigger associated with the policy. Thus, the present invention has programmatic control over the "where" clause to be employed and thus can vary the "where" clause depending on the privileges of a user and/or a user's enterprise.

Figure 5:
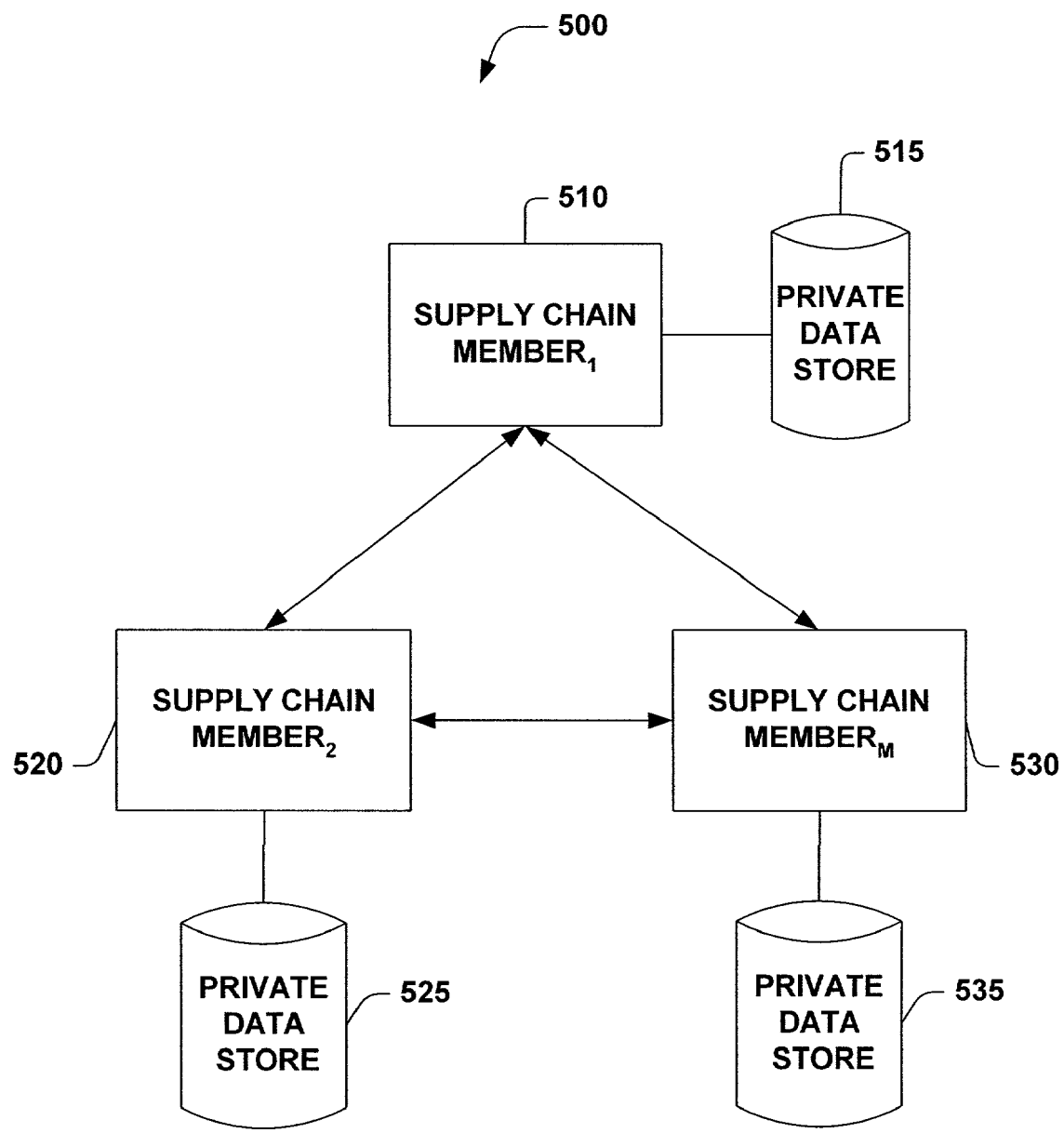
FIG. 5 is a schematic block diagram illustrating a conventional point-to-point supply chain.

Prior Art FIG. 5 illustrates a conventional point-to-point supply chain 500. The conventional supply chain 500 includes a plurality of supply chain members (e.g., SUPPLY CHAIN MEMBER$_1$ 510, SUPPLY CHAIN MEMBER$_2$ 520 through SUPPLY CHAIN MEMBER$_M$ 530, M being an integer). Such conventional supply chain members typically had individually owned and/or controlled private data stores (e.g., private data stores 515, 525 and 535) to which access was restricted. Such private data stores typically stored data with a schema, format and/or content unique to the supply chain member. Thus, integration of data between supply chain members was made more difficult and if supply chain members communicated they typically communicated via EDI (Electronic Data Interchange) and/or paper to one or more other supply chain members. Supply chain members therefore often had to keep multiple protocols, forms, programs and/or procedures to communicate with the other supply chain members, and often had to perform numerous repetitious data entry functions that increased complexity, increased delays and increased costs. Due to security concerns, supply chain members were typically reluctant to allow outside access to their private data stores across their security measures (e.g., firewalls). Thus, opportunities to integrate data, to establish relationships between related data, and to reduce the complexity of sharing supply chain data, and therefore reducing supply chain data processing costs were missed. Thus, the present invention facilitates producing a virtual private supply chain (VPSC).

A VPSC is a conduit through which supply chain data can flow in a timely, secure, consistent manner. Rather than a supply chain member having to maintain possibly distinct protocols, paperwork and records for communicating with other members of a supply chain, by depositing selected data into a central supply chain data store, a supply chain member can maintain one protocol for communicating with the central data store, thereby reducing complexity and/or delays in supply chain processing. The data to be deposited into the central data store can include, but is not limited to, purchase order (PO) information, sales order (SO) information, warehouse order (WO) information, shipment information and inventory information. As inventory moves across a multi-enterprise supply chain, the present invention facilitates enterprises viewing relevant information concerning the deposited items and the inventory to which they relate, regardless of the source of information (subject to proper security).

A design obstacle to be overcome was integrating disparate data (e.g., different formats, content, schema) from multiple supply chain enterprises. Thus, common schema tailored to supply chain operations were defined to which individual supply chain member data could be converted to facilitate data level integration. Such schema relied on industry experience to identify common data points between supply chain members. Some such sample schema include, but are not limited to, an inventory schema (described in FIG. 12), an order system schema (described in FIG. 13), an extensible fields schema (described in FIG. 14), a security schema (described in FIG. 15) and a personalization schema (described in FIG. 16). It is to be appreciated that the conversion of proprietary data to conform to such schema may occur at the supply chain member site and/or at the central site.

Another design obstacle to be overcome was providing reliable communications without using private and/or proprietary data ports. Thus, a design decision to employ Internet based communication via public ports was made which facilitated connecting supply chain members to the central data repository. Employing conventional, public Internet based communication ports facilitates guaranteeing delivery of supply chain data from an enterprise to the operation data store, providing advantages over conventional systems where EDI and/or paper exchange is not guaranteed. In one example of the present invention, the data to be transmitted to the operation data store is persisted locally as a BLOB (Binary Large Object) to further facilitate guaranteed delivery of supply chain data to the operation data store.

With data from a variety of supply chain members stored in a secure database that is accessible via conventional Internet communication tools, real-time collaborative sharing of supply chain data is facilitated. Therefore, rather than a supply chain member sending an EDI or paper request for information to another supply chain member, the supply chain member may employ the Internet to access data to which it has access rights. The data may therefore be accessed in a more timely fashion, reducing delays in supply chain processing. By way of illustration, such interoperability and real-time data sharing may facilitate a supplier transparently carrying in their catalogs items that they do not stock or manufacture, providing advantages over conventional systems.

Figure 6:
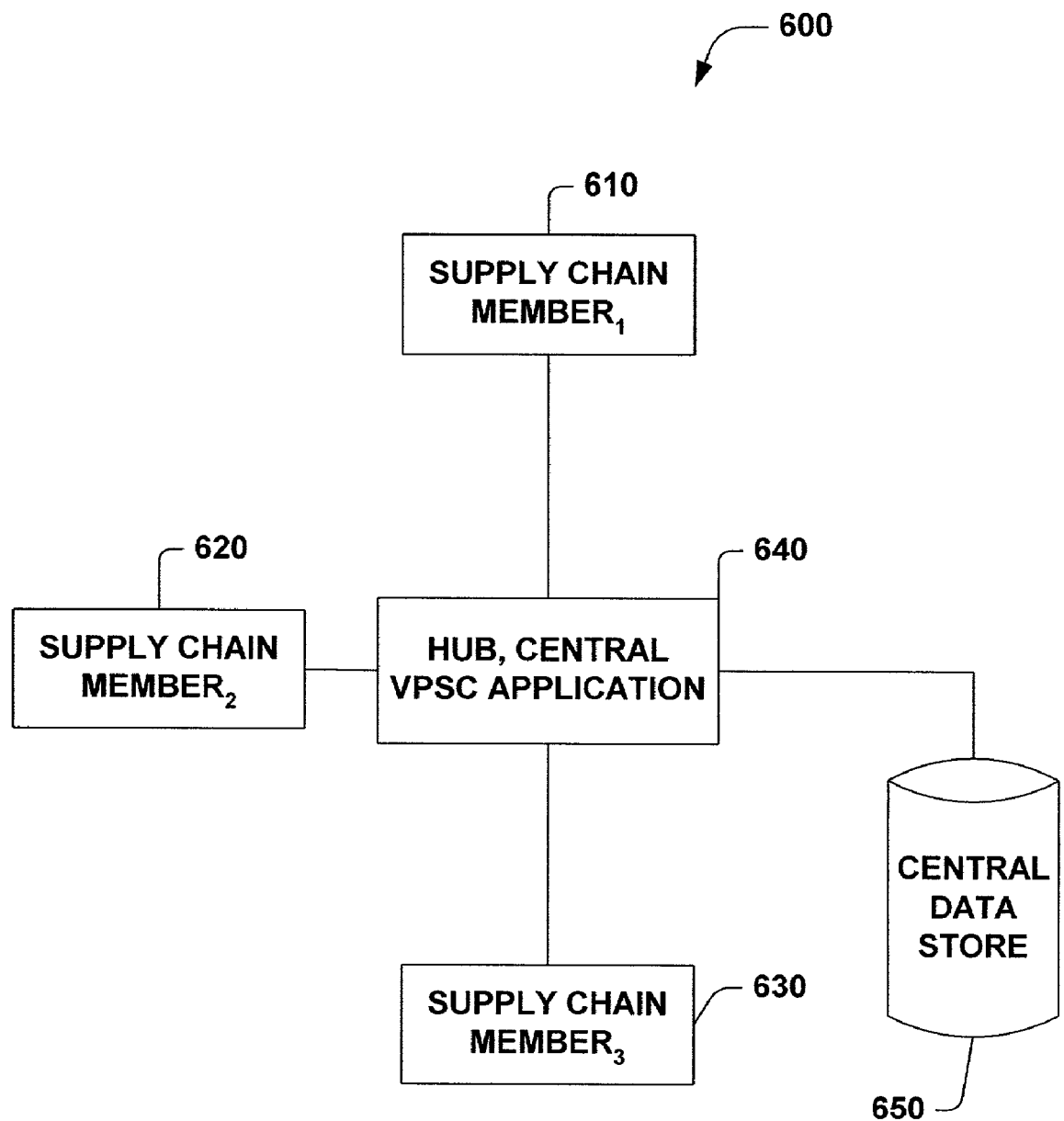
FIG. 6 illustrates a hub and spoke architecture for a VPSC, in accordance with an aspect of the present invention.

Turning now to FIG. 6, a hub and spoke architecture 600 that may be employed in a VPSC is illustrated. The architecture 600 includes a number of spokes (e.g., supply chain member$_1$ 610, supply chain member$_2$ 620, supply chain member$_3$ 630), a hub (e.g., central VPSC application 640) and a central data store 650 operatively connected to the hub 640. Data travels from spokes to the hub 640 and from the hub 640 to spokes, rather than directly between spokes. A spoke can be employed behind a trading partner firewall to communicate with the hub 640, via, for example, the Internet. The hub 640 receives transmissions, decodes the transmission and deposits data into the data store 650. The hub 640 may also perform actions including, but not limited to, transforming the data received from the spokes, validating the data received from the spokes, establishing ownership identifiers for received data items, establishing access permissions for the received data items and establishing relationships between received data items. The hub 640 also originates transmissions to a trading partner, and delivers them to a spoke (e.g., 610) for further delivery inside the firewall.

Figure 7:
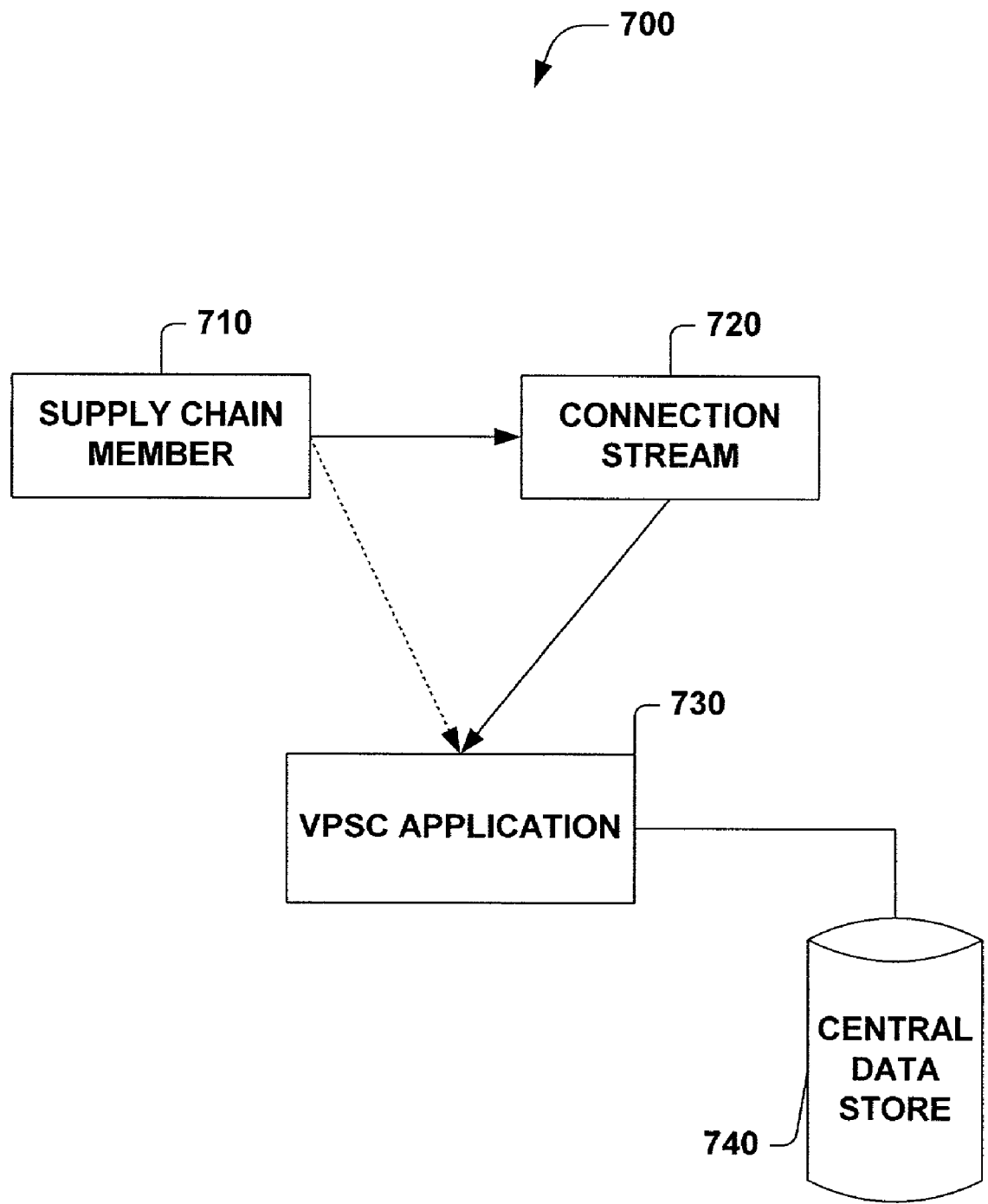
FIG. 7 illustrates a connection stream, in accordance with an aspect of the present invention.

Turning now to FIG. 7, a system 700 that includes a supply chain member 710 that has implemented a connection stream 720 is illustrated. Logically, a supply chain member 710 may communicate with the VPSC application 730 but physically the communication may pass through the connection stream 720. The system includes a VPSC application 730 operably connected to a central data store 740. A connection stream can receive data from an external system in manners including, but not limited to, data being HTTP POSTed to a spoke server in an XML format (e.g., OAG, RosettaNet, etc.) from an IT system inside a trading partner firewall, data being posted directly to a hub server via the Internet if it is in the published XML format of a connection stream BIO (Business Interface Object), flat files being put on a spoke file system for retrieval by a connection stream, and data being extracted by a connection stream spoke from trading partner systems. In the case of flat files, a Java multi-threaded client can be invoked to allow parallel processing of data. The number of threads is configurable and is managed by the Java client. In one example of the present invention, at a spoke (e.g., 610, FIG. 6), incoming data is persisted, and a response is returned to the sending system indicating success or failure of the transmission and/or persisting. The spoke can then accept new transmissions. In one example of the present invention, a connection stream 720 converts the incoming data into the format of a connection stream BIO. A BIO is a Business Interface Object that can be employed as a data transmission standard. Original data sources may be associated with multiple BIOs. As BIOs are created, a connection stream transaction workflow manager performs data cleansing, translating incoming field values from a sending system format to field values with which the present invention interacts. The transaction workflow manager can employ configurable index fields in the incoming data to apply mapping/cleaning rules.

BIOs can be created and packaged together as a transaction. A transaction represents an atomic unit of work for the present invention. A transaction can include multiple BIO types (e.g., an Item Master, Sales Order, Purchase Order, Fulfilling Sales Order, etc.). A connection stream facilitates sending and receiving BIOs in a desired order so that, for example, if a new part number is used, the Item Master BIO will be processed into the present invention before Order BIOs. Such transactions can be transmitted to a hub over the Internet. A connection stream will attempt to connect to a target server a configurable number of times, waiting a configurable amount of time between retries. A connection stream supports transmission protocols including, but not limited to HTTP and HTTPS and can provide a configurable level of encryption.

A connection stream can send data between a spoke and a hub in a compressed format for efficiency. This is transparent to the application layer, but speeds the transmission of data. Furthermore, a connection stream will partition the transmission of data between a spoke and a hub to optimize the size for Internet posting.

In one example of the present invention, as XML transactions are received by a hub, either from a spoke or directly from an external trusted system, the XML transactions are persisted to a database. A response can be returned to the sending system indicating success or failure. At a hub, transaction components are processed by dynamically calling a configurable code module designated by examining the Sender, Receiver, Direction, and MessageType. A selected code module parses the XML transaction and inserts the data into a database. Once components have been successfully consumed, one or more components of the present invention are notified that the transaction is complete and can be processed into its core tables.

When the present invention desires to originate a transmission to a trading partner, for example, when it sends data associated with an incoming shipment, the process described above is reversed. The transaction is persisted at the hub, and delivered as one or more connection stream BIOs to a spoke. The data at the spoke is persisted, and then delivered to the target information system inside the trading partner firewall.

Figure 8:
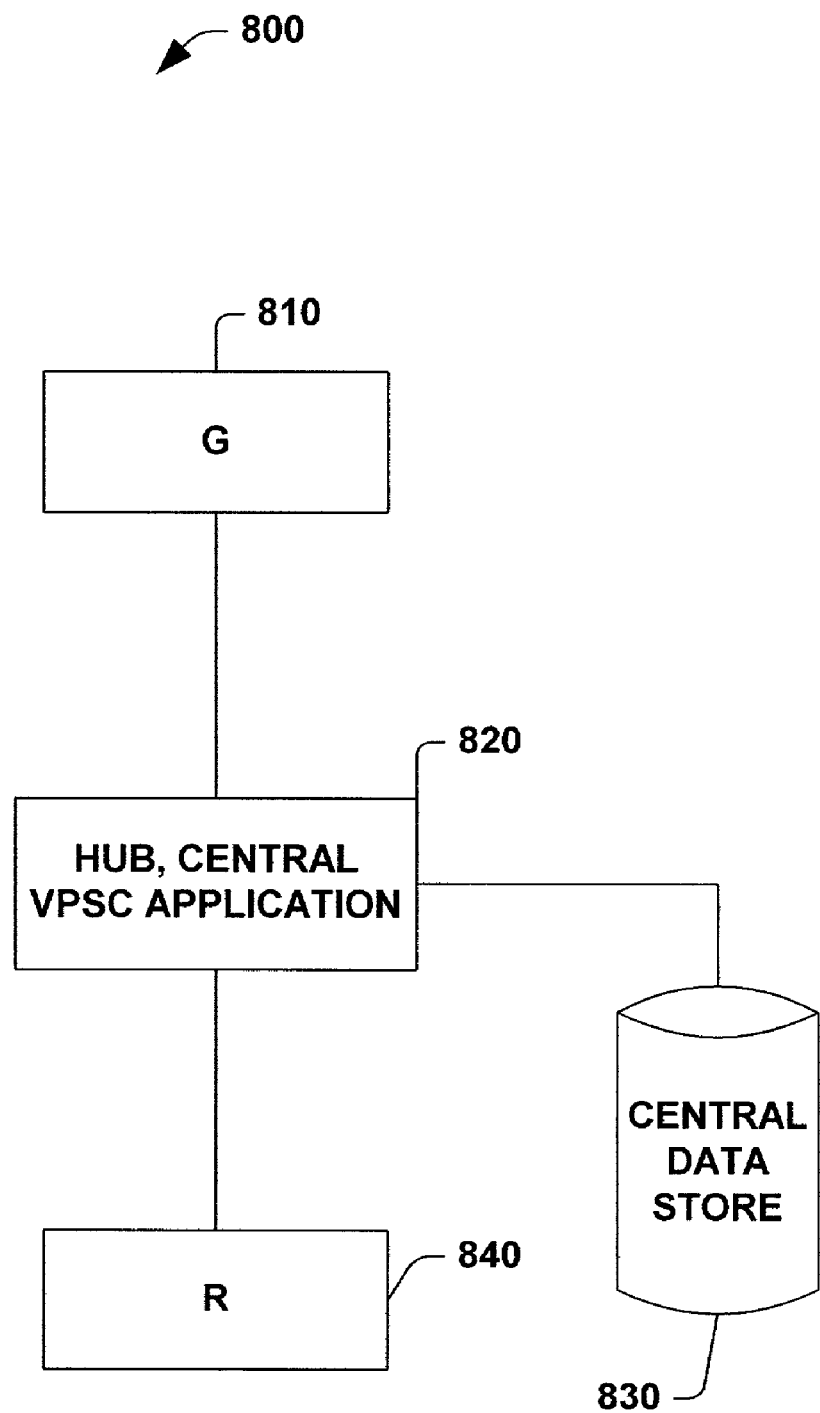
FIG. 8 illustrates one sample hub and spoke architecture, in accordance with an aspect of the present invention.

Turning now to FIG. 8, one example hub and spoke architecture 800 is described. Assume a trading partner G 810 produces an EDI 856 file containing order information. This file is parsed at the G spoke 810 and translated into Item Masters, Sales Orders, Fulfilling Sales Orders, Delivery Orders, and Shipments, for example. This data is transmitted to the connection stream hub 820. Third party logistic entity R 840 accesses the user interface of the present invention to update the actual carrier Shipment information. Upon entry of this data, the present invention creates a Shipment BIO to be sent to third party logistic entity R 840. The Shipment BIO is converted, for example, into an EDI 943 Ship Message at the third party logistic entity R 840 spoke. This message feeds into the third party logistic entity R 840 system and notifies, for example, warehouse personnel that an order is ready to be shipped. Third party logistic entity R 840 ships the designated shipment to a Merge-In-Transit center and upon receipt of the shipment at the merge center, third party logistic entity R 840 produces an EDI 944 receipt confirmation transaction. This transaction is processed by the spoke, resulting in a Purchase Order BIO. A user interface screen in the present invention is employed to release the order once shipments for the order have been received at the Merge-In-Transit center. When the order is released, the present invention creates a Delivery Order BIO and sends it to third party logistic entity R 840. The third party logistic entity R 840 spoke receives the Delivery Order BIO and transforms it into an EDI 940 Warehouse Shipping Order. When the shipment is made from the merge center, third party logistic entity R 840 produces an EDI 945. This EDI 945 is transformed into a delivery order and shipment BIO and transmitted. This shows in the present invention that the order has been shipped. As third party logistic entity R 840 receives EDI 214 updates (e.g., delivery status reports) from their carriers, the information is transformed into a Delivery Status BIO and sent to the hub 820, so that users of the present invention can see the shipment status and history.

Although various EDI forms are described above, it is to be appreciated that a greater and/or lesser number of such EDI forms, and that a different mixture and/or variety of such forms may be employed by the present invention.

Figure 9:
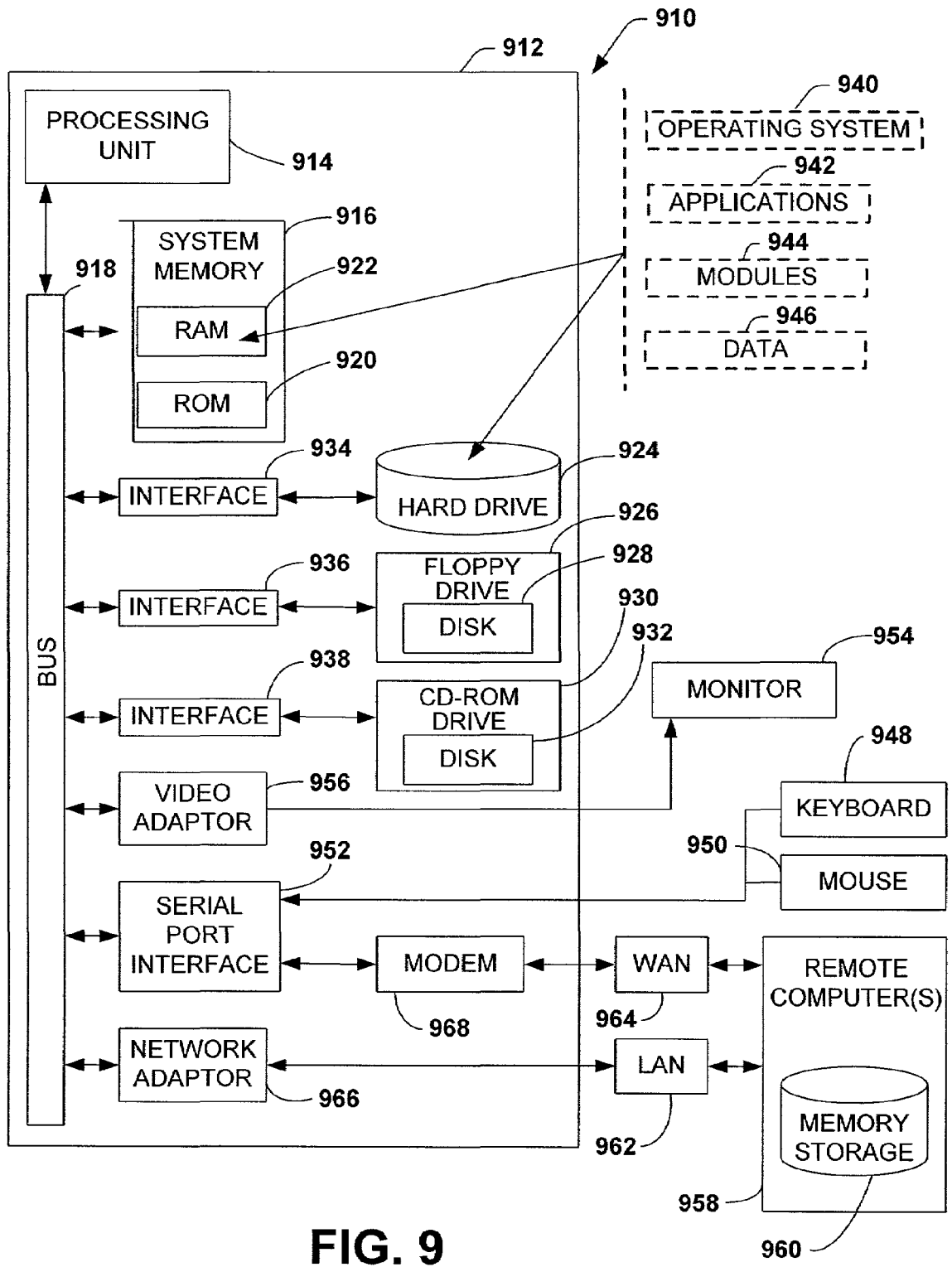
FIG. 9 is a schematic block diagram of an exemplary operating environment for a system configured in accordance with the present invention.

In order to provide additional context for various aspects of the present invention, FIG. 9 and the following discussion are intended to provide a brief, general description of one possible suitable computing environment 910 in which the various aspects of the present invention may be implemented. It is to be appreciated that the computing environment 910 is but one possible computing environment and is not intended to limit the computing environments with which the present invention can be employed. While the invention has been described above in the general context of computer-executable instructions that may run on one or more computers, it is to be recognized that the invention also may be implemented in combination with other program modules and/or as a combination of hardware and software. Generally, program modules include routines, programs, components, data structures, etc. that perform particular tasks or implement particular abstract data types. Moreover, one will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

FIG. 9 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 9, an exemplary environment 910 for implementing various aspects of the invention includes a computer 912, including a processing unit 914, a system memory 916, and a system bus 918 that couples various system components including the system memory to the processing unit 914. The processing unit 914 may be any of various available processors. Dual microprocessors and other multi-processor architectures also can be used as the processing unit 914.

The system bus 918 may be any of several types of bus structure including a memory bus or memory controller, a peripheral bus, and a local bus using any of a variety of available bus architectures. The available memory 916 includes read only memory (ROM) 920 and random access memory (RAM) 922. A basic input/output system (BIOS), containing the basic routines that help to transfer information between elements within the computer 912, such as during start-up, is stored in ROM 920.

The computer 912 may further include a hard disk drive 924, a magnetic disk drive 926, e.g., to read from or write to a removable disk 928, and an optical disk drive 930, e.g., for reading a CD-ROM disk 932 or to read from or write to other optical media. The hard disk drive 924, magnetic disk drive 926, and optical disk drive 930 are connected to the system bus 918 by a hard disk drive interface 934, a magnetic disk drive interface 936, and an optical drive interface 938, respectively. The computer 912 typically includes at least some form of computer readable media. Computer readable media can be any available media that can be accessed by the computer 912. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer 912. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM 922, including an operating system 940, one or more application programs 942, other program modules 944, and program non-interrupt data 946. The operating system 940 in the computer 912 can be any of a number of available operating systems.

A user may enter commands and information into the computer 912 through a keyboard 948 and a pointing device, such as a mouse 950. Other input devices (not shown) may include a microphone, an IR remote control, a joystick, a game pad, a satellite dish, a scanner, or the like. These and other input devices are often connected to the processing unit 914 through a serial port interface 952 that is coupled to the system bus 918, but may be connected by other interfaces, such as a parallel port, a game port, a universal serial bus ("USB"), an IR interface, etc. A monitor 954, or other type of display device, is also connected to the system bus 918 via an interface, such as a video adapter 956. In addition to the monitor, a computer typically includes other peripheral output devices (not shown), such as speakers, printers etc.

The computer 912 may operate in a networked environment using logical and/or physical connections to one or more remote computers, such as a remote computer(s) 958. The remote computer(s) 958 may be a workstation, a server computer, a router, a personal computer, microprocessor based entertainment appliance, a peer device or other common network node, and typically includes many or all of the elements described relative to the computer 912, although, for purposes of brevity, only a memory storage device 960 is illustrated. The logical connections depicted include a local area network (LAN) 962 and a wide area network (WAN) 964. Such networking environments are commonplace in offices, enterprise-wide computer networks, intranets and the Internet.

When used in a LAN networking environment, the computer 912 is connected to the local network 962 through a network interface or adapter 966. When used in a WAN networking environment, the computer 912 typically includes a modem 968, or is connected to a communications server on the LAN, or has other means for establishing communications over the WAN 964, such as the Internet. The modem 968, which may be internal or external, is connected to the system bus 918 via the serial port interface 952. In a networked environment, program modules depicted relative to the computer 912, or portions thereof, may be stored in the remote memory storage device 960. It will be appreciated that the network connections shown are exemplary and other means of establishing a communications link between the computers may be used.

Figure 10:
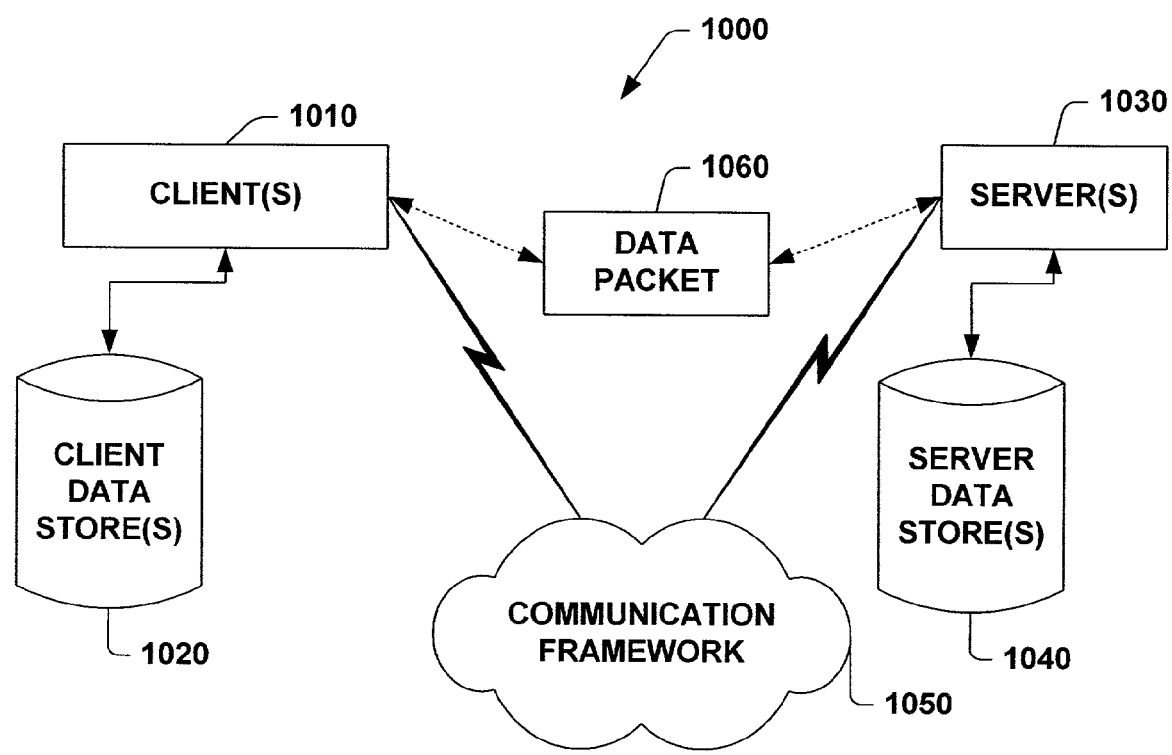
FIG. 10 is a schematic block diagram of an exemplary communication environment for a method performing in accordance with the present invention.

FIG. 10 is a schematic block diagram of a sample computing environment 1000 in which the present invention may operate. The system 1000 includes one or more clients 1010. The clients 1010 may be hardware and/or software (e.g., threads, processes, computing devices). The system 1000 also includes one or more servers 1030. The servers 1030 may also be hardware and/or software (e.g., threads, processes, computing devices). In one example of the present invention, a data packet 1060 may be transmitted, for example, between a client 1010 and a server 1030. One example data packet 1060 may hold virtual private supply chain information concerning, for example, access permissions, connection stream processing, and relationships. Another example data packet 1060 may hold, for example, generic Internet based data viewing information concerning, for example, data to be displayed and/or metadata concerning how such data is to be displayed.

The system 1000 includes a communication framework 1050 that can be employed to facilitate communications between the clients 1010 and the servers 1030. The clients 1010 are operably connected to one or more client data stores 1015 that can be employed to store information local to the clients 1010. Similarly, the servers 1030 are operably connected to one or more server data stores 1040 that can be employed to store information local to the servers 1030.

Turning now to FIG. 11, a sample layout order screen 1100 that may be employed by a generic Internet based viewing engine is illustrated. Frames in the sample layout order screen 1100 include the view headings 1110, (which are the columns selected by the user-defined profile of the 'View' type for the selected interface and are labeled with user and/or enterprise definable prompts from the database), the query criteria 1120, (which are the columns selected by the user-defined profile of the 'Query' type for the selected interface and are also labeled with user/enterprise definable prompts), the view results 1130, (which are the data retrieved from the base view for the interface after applying both the query criteria entered and the security domain context), and the additional information anchors 1140, (which are dynamically determined links to other pages based on data availability). The sample layout order screen 1100 may also display error messages (not illustrated).

It is to be appreciated that the discussion related to FIG. 11 concerning the view headings 1110, the query criteria 1120, the view results 1130, the additional information anchors 1140 and error messages relate to one specific example of the present invention and thus discuss particular tables, fields, values and the like. It is to be appreciated that the screen and such tables, fields, values and the like are but one example of the present invention and are intended as an illustration and not a limitation.

Security may be configured so that not all interfaces are available to a user. The present invention may be pre-populated with data employed in displaying interfaces. Visibility interfaces, defined in an INTERFACES table (FIG. 16), may be based upon a primary database. A base view may be identified in an INTERFACE_FRAMEWORKS table (FIG. 16), and related to the interface via an intf_itfr_id column. The views are defined to denormalize data to be displayed and to provide consistent names for common columns across interfaces. Such common names and associated data types may be stored, for example, in the FIELD_MASTERS (FIG. 16) table. The FRAMEWORK_DETAILS (FIG. 16) table contains information regarding the context and display of the available fields for each view and any related columns, such as additional detail fields that are available for query only. In one example of the present invention, this data may not be changed at an installation. For primary database views, there may be an additional multi-language version of the view for users not employing the default language for the installation to minimize performance implications of multi-language support of description fields. The columns in these views are substantially similar to the columns in the primary views, and so additional information concerning those columns is not stored.

Concerning the query criteria 1120 illustrated in FIG. 11, such query criteria 1120 labels and fields may be displayed based on the appropriate user profile once an interface identification is determined. A USER_PROFILE_VIEW (FIG. 16) database view contains the names of the user's profiles (column profile_name) by interface id (interface_id). The last set of criteria accessed by a user is saved as the active profile. The currently active profile for an interface is indicated by a flag value (e.g., '1') in the active_ind column. If no active profile is defined, the 'Basic' profile shipped with the system is used. The primary key of this table is a sequence-generated number (profile_seqno in the view, uspf_seqno in the underlying user_profiles table). The Profile_Type of 'QRY' is used to retrieve Query Criteria profiles.

Once the query profile to be displayed has been chosen, the labels and type of data entry to be used can be retrieved from a USER_QUERY_PROFILES_VIEW, for example. A USR_LABEL column contains user-defined labels for query fields if defined, otherwise it contains labels defined for the user enterprise if they exist, otherwise it contains the standard prompts delivered with the product in the user language.

A view column Query_Type (FIG. 16) defines whether the column data is to be captured in screen elements including but not limited to a text box (TXT), a checkbox (CKB), a single-value list (LIS), or a multiple-value list (MLS). If a list type is to be used, the SQL text for collecting the data to be displayed in the list is also stored in Query_List. The SQL text retrieves a single value, which is aliased to LISTVALUE. These fields may be sized based on the available real estate for the query box, and text boxes may be scrollable. The Sequence column defines the order in which the fields are displayed, for example, top to bottom. The data type of the field, employed in building the WHERE clause for the statement that will process the query, is stored in the Datatype column. Valid types for query columns include, but are not limited to, C (character), N (number), D (date), and T (time). When dates are available for query, the preferred format of the user is displayed beneath the prompt in parentheses. Time format may be, for example, fixed as HH24:MI, and is also displayed beneath the prompt.

The layout of query fields may be determined, for example, by data in the USER_QUERY_PROFILES_VIEW. If there are more columns to be displayed than can be formatted within the Query Frame one or more second tabs may be generated. The user may display the additional fields by clicking the mouse on such second tabs. The user may enter wildcards and/or comparison operators in a query text box. Wildcarded entries in fields based on list boxes may be provided. Use of operators necessitates parsing values when constructing the where clause of the SQL statement that will return the view results. Simple validation is employed for the query criteria to avoid SQL errors, such as the absence of non-numeric characters in number fields and valid date formats.

Concerning the view headings 1110 illustrated in FIG. 11, such view headings 1110 may also be displayed based on the appropriate user profile once the interface identifier is determined. A USER_PROFILE_VIEW (FIG. 16) is queried with the interface id and profile_type of 'VEW' to determine the currently active profile name for the user. Again, if no active profile is defined, the 'Basic' profile shipped with the system will be used.

The labels for the view headings may be retrieved, for example, from a USER_VIEW_PROFILES_VIEW database view. The maximum width of the table cell for each heading may be found, for example, in USR_DISPLAY_WIDTH as well as an indicator to wrap or truncate the displayed data (USR_Wrap_Ind). A Usr_Upper_Label and Usr_Lower_Label pair of columns may be employed, for example, to hold two-line labels; if only one is required, the Usr_Lower_Label should be used. The field data type specifies the type of data as for query columns, and additionally the field display_type column specifies if the results should be displayed as text (NOR) or as a status light (LGT).

Concerning the view results 1130 illustrated in FIG. 11, such view results 1130 may be retrieved based on dynamic SQL statements that are constructed using the column names from the view headings in the select clause and the column names and values from the query criteria in the where clause. Row-level supply chain data security may be used to further restrict the data returned to that for which the user has view access. An SQL statement may be constructed, for example, as follows:

The SELECT clause is built dynamically at the time that the user saves a profile via an RC_CREATE_PROFILE. BUILD_CLAUSES stored procedure, for example. The procedure, which takes the uspf_seqno key of the user_profile as an argument, saves the select clause in the user_profiles.uspf_selectclause column. It is built from the column names returned from the query for the View Headings frame, which have been stored in the PROFILE_COLUMNS table. The primary key of the base table of the view is added as the last column selected, although this is not presented to the user. This data is employed for the drill-down screens. The column is named based on the short view name stored in interface_frameworks (itfr_viewshortname) concatenated with '_SEQNO'. For instance, for the sales_order_view, the short name is SOV and the primary key is stored in SOV_SEQNO.

Date formatting is employed, so user preferred DateFormat session variable should be used to determine if US or European date formatting will be applied. Columns of type 'D' (date) or 'T' (time) are formatted. This formatting should be done in the select clause with the TO_CHAR function since the format of the date returned will be dependent on the NLS_LANGUAGE setting for the database and cannot be pre-determined. A set of system parameters will be provided to specify the date and time format of US and European dates.

The FROM clause is built using the view name (itfr_primaryview) for the interface from the INTERFACE_FRAMEWORKS table if the user language is the default language for the installation; otherwise an '_ML' is appended to the view name to choose the multi-language view.

The WHERE clause is constructed dynamically. {text in braces} should be replaced by the value of the column; normal text in this size font is to be entered verbatim; text in italics are examples.

For columns in the Query Criteria frame for which the user has entered data:
If the BASEIND='1' (base view query column)
Create the left hand side of the clause based on the field in the view:
AND {FRDT_COLUMN_NAME}
if the field name is ORDER_ID:
AND ORDER_ID
If the value for the column was entered directly (not a list item):
If the 1st non-blank character in the text box for that column is in the set of operators (!, =, >, <)
Add the full VALIDATED operator to the where clause
Else if a wildcard (*) character is contained in the entry
Add the keyword LIKE
Else
Add the operator=
End if
Add the value entered by the user:
If the field is non-numeric, enclose in single quotes
If the field is a date, cast it to a date using the user's dateformat as the mask in the TO_DATE function
If the data type is Time, cast it to a date using the format HH24:MI. If only hours have been entered (1 or 2 digits), use HH24.
End If direct entry
Else if the value was selected via a list box
Add the keyword IN followed by an open parenthesis:
IN (Add the list selected by the user—If the field is non-numeric, enclose each list item in single quotes
Add the closing parenthesis:)
End if list box entry
Else if the value was selected via a checkbox:
Add the clause: ='1'
End if checkbox entry
End if type=1
Else if the type is a sub-query (FRDT_BASEIND='0')
If the table name does not match the last table name processed:
If already building a sub-query, close it with a)
If the main query included some query criteria:
Build a new where-exists clause:
Add the clause:
AND EXISTS (SELECT 1 FROM {FRDT_TABLENAME}
Add the key-join where clause:
WHERE
{ITFR_PRIMARYVIEW}.
{ITFR_SHORTNAME}_SEQNO={FRDT_TABLENAME}.{ITFR_SHORTNAME}_SEQNO
Else build an IN clause:

Add the clause:
AND
{ITFR_PRIMARYVIEW}.{ITFR_SHORT
NAME}_SEQNO in (
SELECT {ITFR_SHORTNAME}_SEQNO FROM
Add: WHERE 1=1
Endif already building a sub-query
Create the left-hand side of the condition based on the column:
AND {FRDT COLUMNNAME}
The ORDER BY clause is also generated via the RC_CREATE_PROFILES package.

To display the results, the FRDT_DisplayType column found, for example, in FRAMEWORK_DETAILS (FIG. 16) is consulted. If the display type is Normal, then the retrieved columns are displayed as they were selected (formatting already applied via the select). If the column is numeric, it is right-justified; other data is left-justified. If the display type is Light, then the returned data is expected to name, for example, a standard HTML Color attribute and a status light of that color should be displayed. Internally these columns may be PL/SQL functions embedded in the view, so the installation can define the conditions that set the different colors by enterprise and user.

Figure 16:
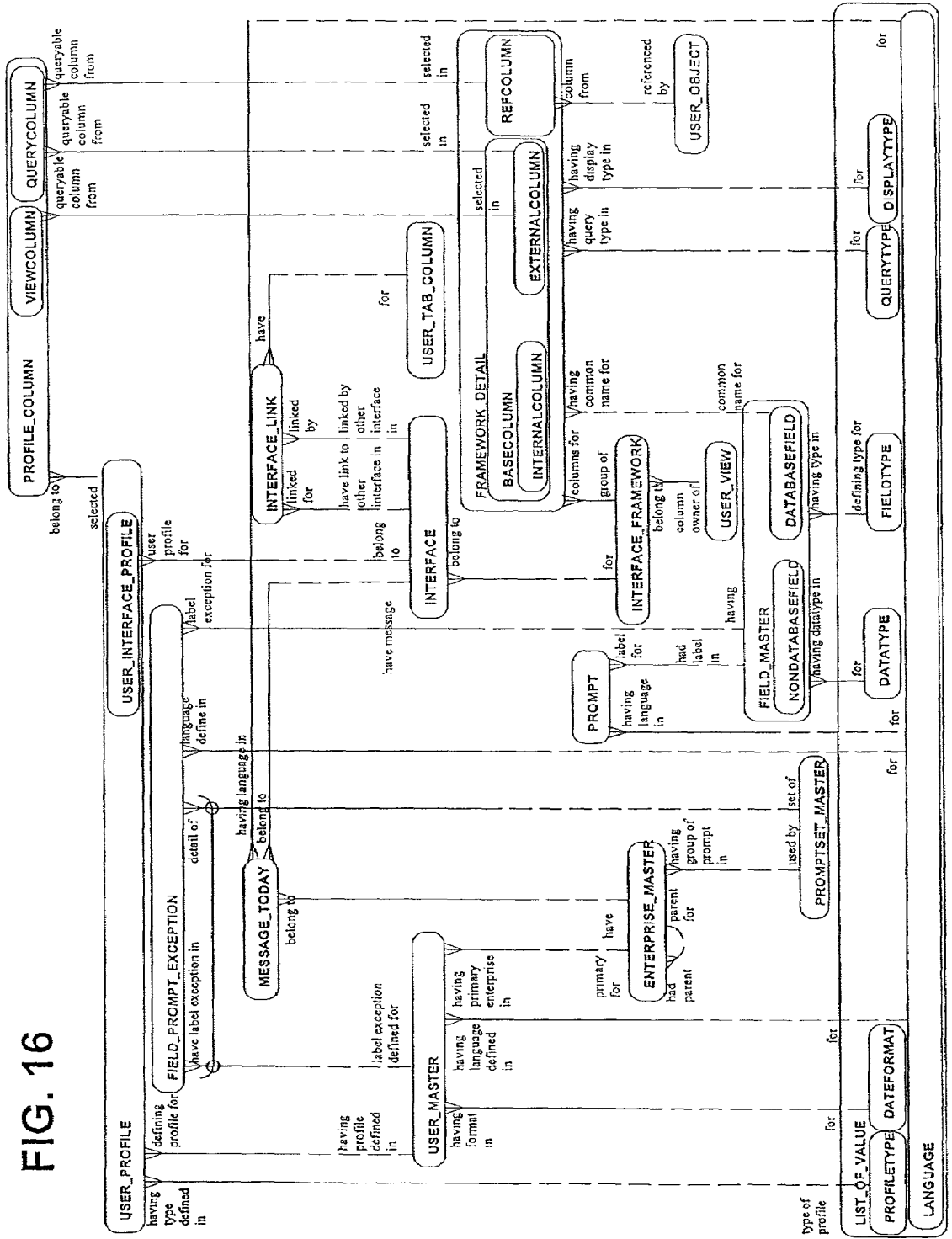
FIG. 16 is an example schema associated with personalizing a generic Internet based viewing engine, in accordance with an aspect of the present invention.

Concerning the additional information anchors 1140 illustrated in FIG. 11, such additional information anchors 1140 are dynamically determined based upon the presence of related data in other interfaces for rows returned in the view results. A 'More Info' icon is displayed when links may be available, and clicking on a result row will display the list of anchors for those links. The list of possible related interfaces for the current interface can be retrieved from INTERFACE_LINKS (FIG. 16). This table contains a row for links that may be available from a specific interface id (ITLN_INTF_FROMID). The ITLN_FORMNAME may contain the relative path and form name of the form to be displayed via the link; if null or DETAIL, then it accesses the standard drill-down form. The ALL_INTERFACES_VIEW is queried to retrieve the description of the available drill-downs in the user's language; the USER_INTERFACE_ACCESS_VIEW is also joined in to restrict the list of available links to those to which the user has been granted access.

The called form takes the {itfr_viewshortname}||_SEQNO column of the row in the calling form as an argument in order to redisplay the correct data as a header row. An ITLN_CONDITIONCOLUMN contains the column name of the column in the base view of the current interface that is employed to retrieve the data related to the current row. Normally this is the same as the primary key of the base table for the view on which the screen is based, but it may be a foreign key. The query for the detail data in the drill down screen is built as follows:
1. Retrieve the uspf_selectclause for the active view profile for the interface id of the itln_intf_toid for the followed link.
2. Add a from clause using the contents of the ITFR_PRIMARYVIEW column for the interface_framework for the to interface.
3. If the ITLN_CONDITIONCOLUMN is the same as the primary key (short_name_SEQNO) for the from interface, add a where clause to join on the data selected for that column for the current row:
WHERE
{itln_conditioncolumn}=data_value_for_current_row
4. If the ITLN_CONDITIONCOLUMN is not the primary key retrieved as the last value in the calling form's select statement, fetch the data from the base view of the calling form for the current row (the itfr columns are for the calling form)
SELECT {itln_conditioncolumn} FROM {itfr_primaryview}
WHERE {itfr_viewshortname||'_SEQNO'}={value from current row}
Use this value to build the where clause for the detail data:
WHERE {itln_conditioncolumn}={retrieved data}
5. Add the Order By clause from the uspf_orderbyclause column for the active view profile for the interface id for the itln_intf_toid for the followed link.

For example, for an interface link from the shipment details interface to Shipment-BOL Info, the ITLN_CONDITIONCOLUMN is BOLV_SEQNO (primary key of the Bill of Lading View). The primary key of the Shipment Details base view (SHIPMENT_DETAIL_VIEW) is SHDV_SEQNO (interface framework id 4; itfr_viewshortname SHDV), so the original select clause for the data displayed on the Shipment Details screen does not include the required column for the join condition. The interface framework for Shipment-BOL Info is identifier 3, the base view is BOL_VIEW, and the short name is BOLV. The required data is retrieved as follows:
1. The USER_PROFILE VIEW is queried for the profile_seqno of the active profile for the user for the 'to' interface Shipment-BOL Info of profile_type='VEW'.
2. That profile_seqno is used to query user_profiles (column uspf_seqno) to retrieve the select and order by clauses required. Additionally, data about the columns to be displayed is fetched from USER_VIEW_PROFILES_VIEW as for the main screens.
3. The from clause is built as 'FROM BOL_VIEW'
4. The Shipment_Detail_view is queried for the value of the BOLV_SEQNO for the SHDV_SEQNO of the row from which the link is invoked (the value to be used is always the final column fetched for each row displayed).
5. The value retrieved in (4) is used to construct the where clause for the drill-down screen: WHERE BOLV_SEQNO={fetched value}

Error messages may be retrieved from a database and may be displayed in the user language, if available—otherwise the default language of the system is employed. Error messages that are predictable may be defined in the MESSAGE_MASTERS and MESSAGES table in advance—error numbers are assigned within ranges by the RC DBA. If a general 'unexpected error' is required, the EC_UNKNOWN_SQLERROR error is returned with the applicable error message number displayed, if any.

Figure 12:
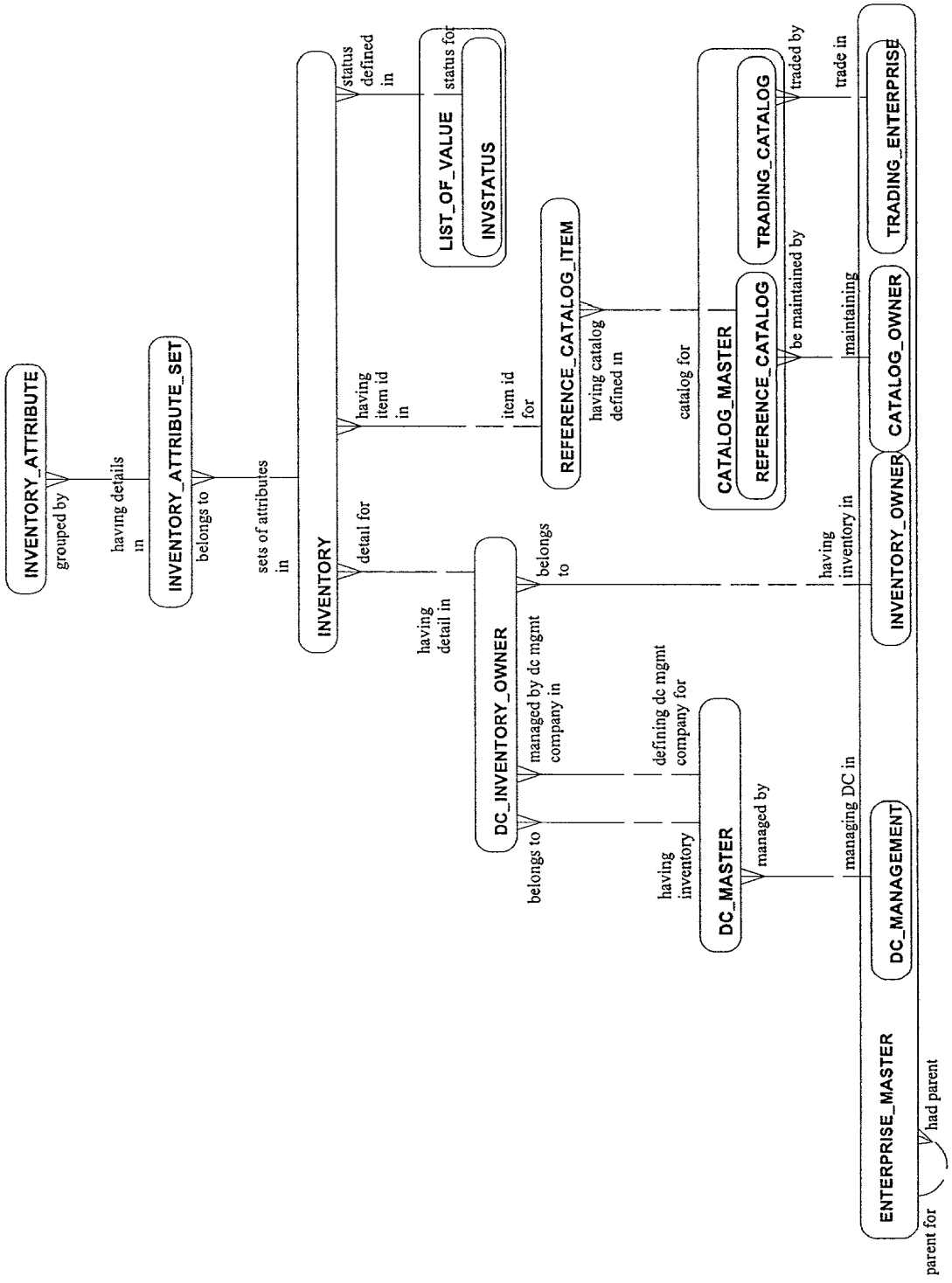
FIG. 12 is an example schema associated with a VPSC inventory, in accordance with an aspect of the present invention.

FIG. 12 is an example schema associated with a VPSC inventory. It is to be appreciated that the schema is but one possible schema and is intended as an illustration and not a limitation. The schema facilitates the present invention storing inventory for registered enterprises. Enterprises may have one or more catalogs to group the items. The inventory is stored in sites owned or managed by enterprises. The present invention may also store inventory attributes including, but not limited to lot identifier, batch number, expiration date etc.

Figure 13:
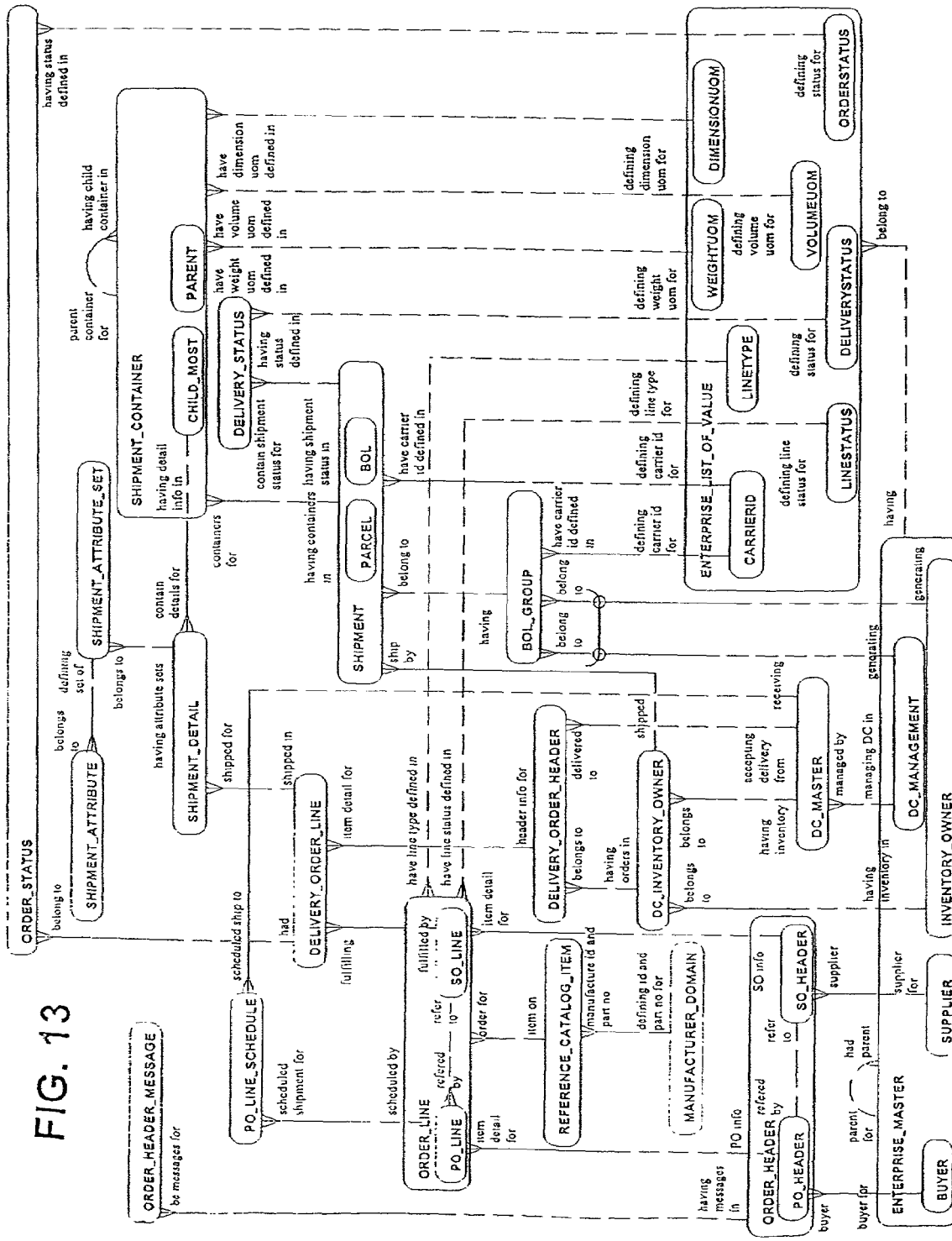
FIG. 13 is an example schema associated with an order system, in accordance with an aspect of the present invention.

FIG. 13 is an example schema associated with an order system. It is to be appreciated that the schema is but one possible schema and is intended as an illustration and not a limitation. The schema facilitates showing the life cycle of an order starting from a PO until it is shipped. Data in the schema comes from data acquisition functionality. This data may be used, for example, in track and trace processing. Users can track items including, but not limited to, enterprise and/or site to fulfill their SO, receiving schedule to fulfill their SO, whether their order has been shipped, which carrier shipped an order, shipped attributes, container identifier, shipment status (e.g., delayed, on time, damaged etc.), and the like.

Figure 14:
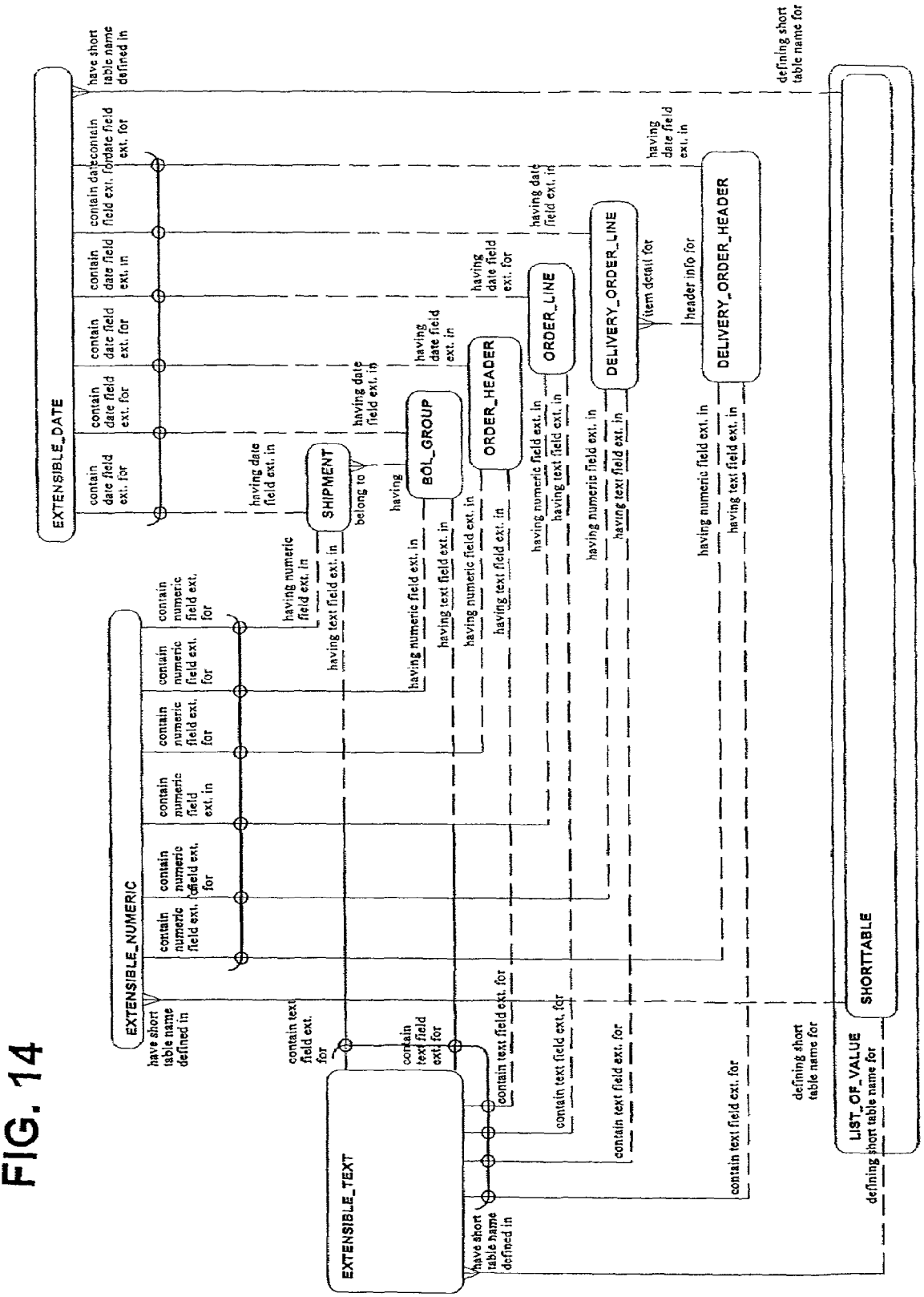
FIG. 14 is an example schema associated with extensible fields employed with a VPSC, in accordance with an aspect of the present invention.

FIG. 14 is an example schema associated with extensible fields employed with a VPSC and/or generic Internet based supply chain data viewer. It is to be appreciated that the schema is but one possible schema and is intended as an illustration and not a limitation. Such extensible fields facilitate customers storing and naming their own fields, providing flexibility advantages over conventional systems.

Figure 15:
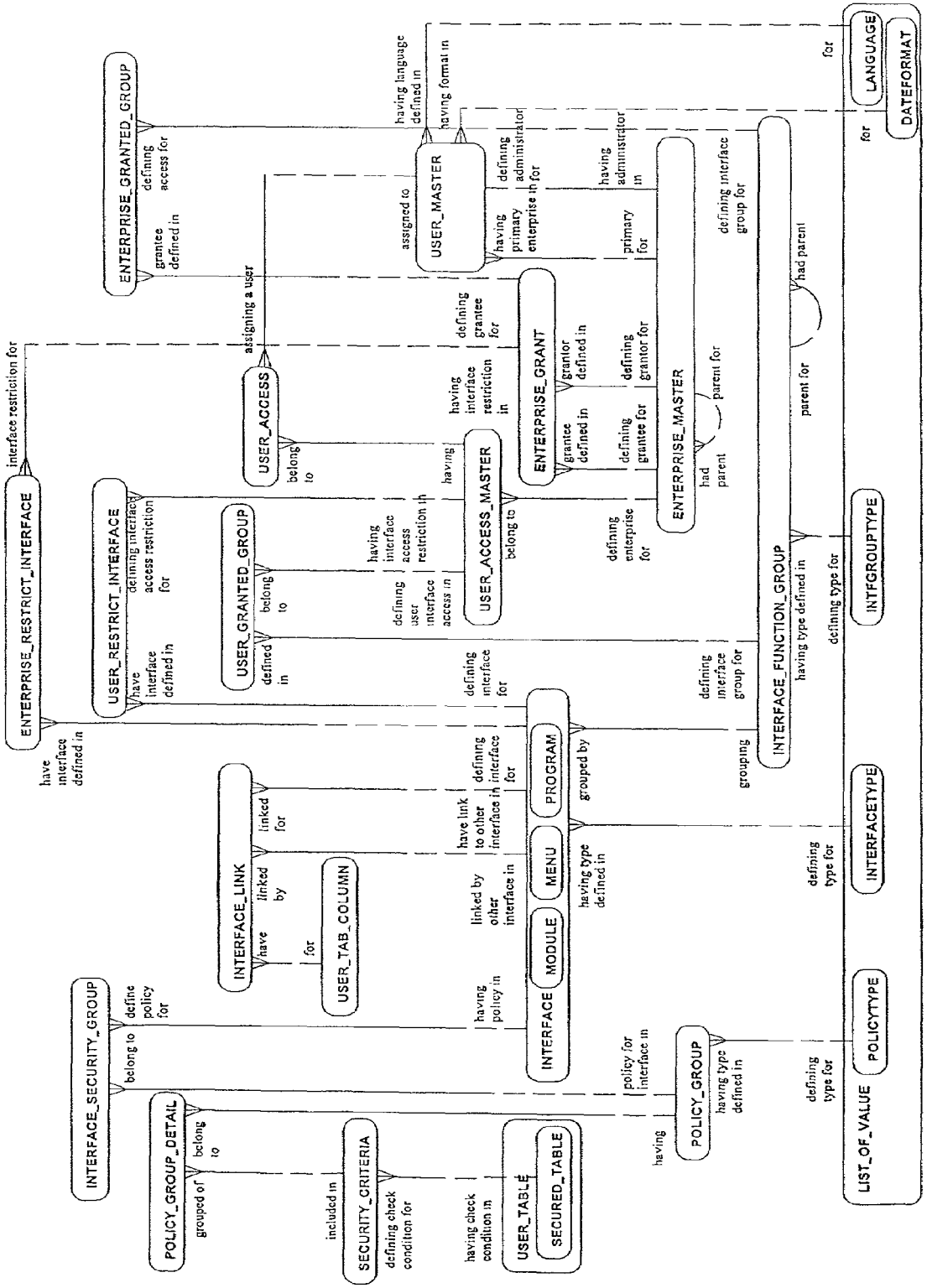
FIG. 15 is an example schema associated with VPSC security, in accordance with an aspect of the present invention.

FIG. 15 is an example schema associated with VPSC security. It is to be appreciated that the schema is but one possible schema and is intended as an illustration and not a limitation. There are multiple enterprises involved in processing associated with the present invention and thus the present invention facilitates preventing users of one enterprise from seeing data from other enterprise. The schema illustrates the entities that support supply chain row level security and menu level security. Enterprises can grant access levels including, but not limited to full access or related data only access to other enterprises. To further secure the data, the present invention allows enterprises to limit what menus (screens) a user can see. Supply chain row level security is achieved by implementing fine-grained access control. In one example of the present invention, security tables are configurable by an administrative user.

FIG. 16 is an example schema associated with personalizing a generic Internet based viewing engine. It is to be appreciated that the schema is but one possible schema and is intended as an illustration and not a limitation. The entities in the schema facilitate an end user personalizing a web site. Screens are represented by an interface identifier, which operates based on a framework that tells the screen what kind of data to display. The field headings are defined as prompts that a user (enterprise) can change according to their needs. The user is allowed to navigate from one screen to another based on a pre-defined interface link. Basic profiles come as canned profiles provided by one aspect of the present invention that define the set of fields that user can query and fields to display. The user is allowed to create/change their own profile in which they can change the list of fields that they can query or displayed, change field heading, field length, the sorting of the displayed data etc.

Figure 17:
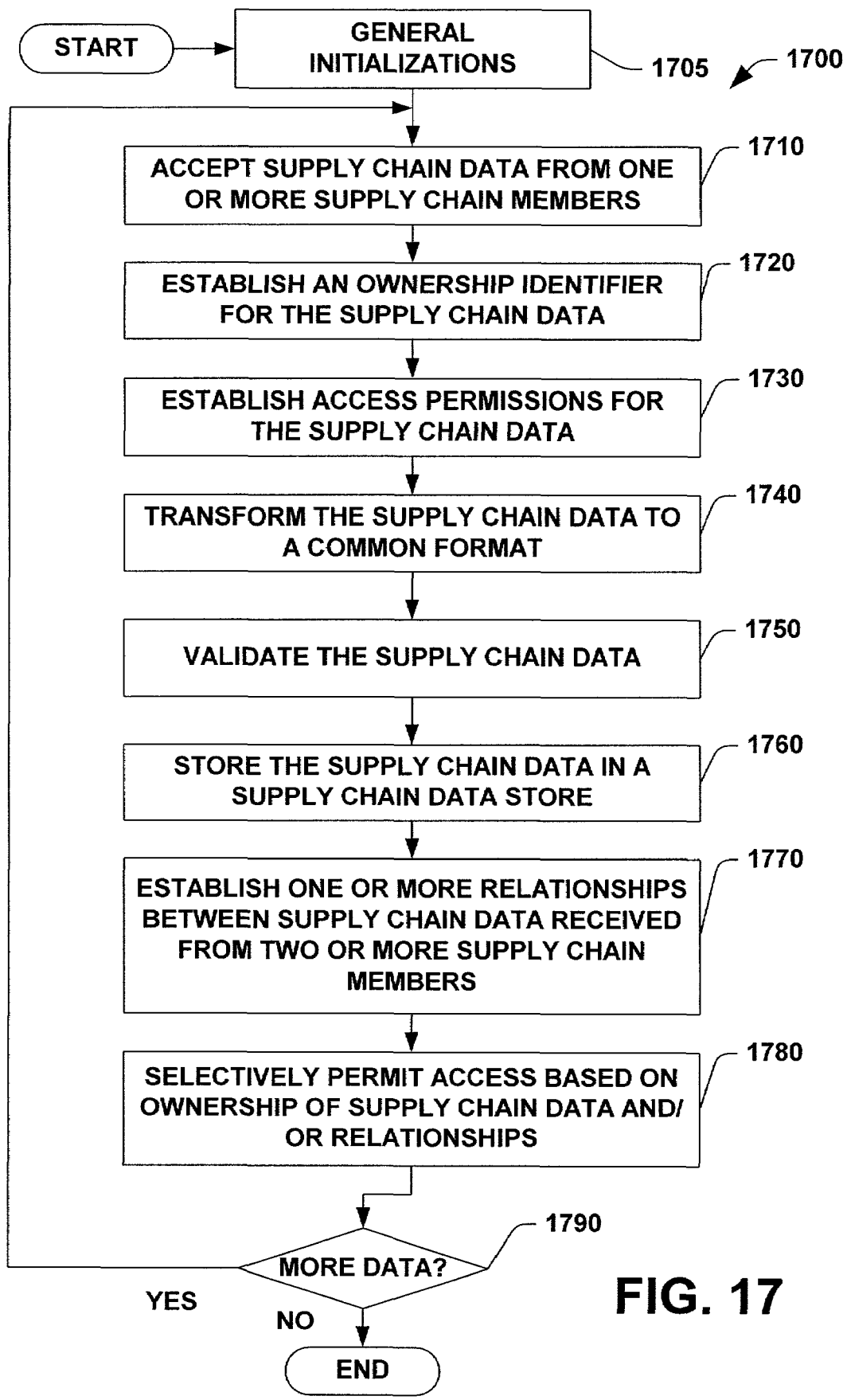
FIG. 17 is a flow chart illustrating a method for processing data in a VPSC, in accordance with an aspect of the present invention.
Figure 18:
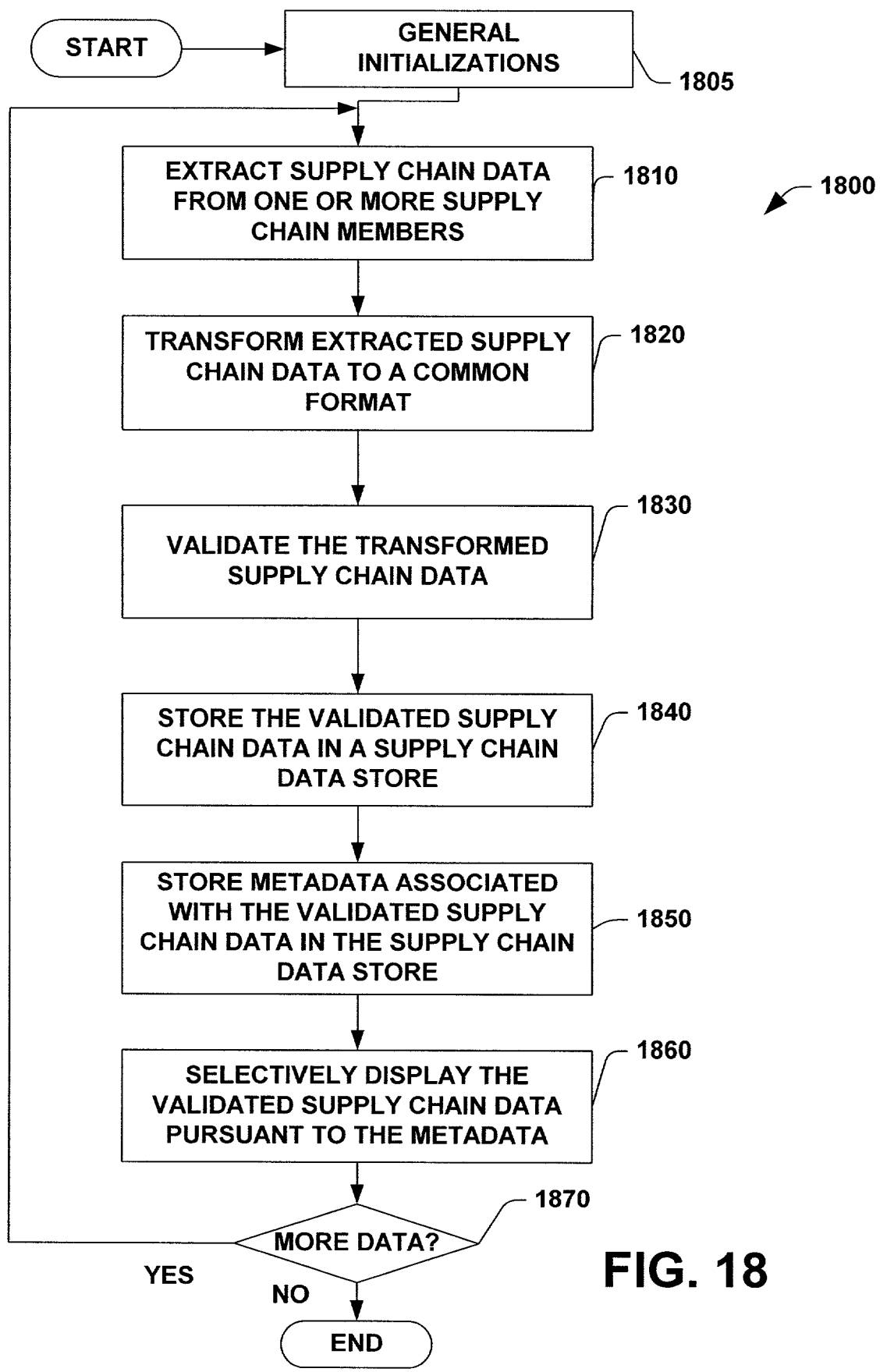
FIG. 18 is a flow chart illustrating a method for processing data by a generic Internet based viewing engine, in accordance with an aspect of the present invention.

In view of the exemplary systems shown and described above, methodologies that may be implemented in accordance with the present invention will be better appreciated with reference to the flow charts of FIGS. 17 and 18. While, for purposes of simplicity of explanation, the methodologies are shown and described as a series of blocks, it is to be understood and appreciated that the present invention is not limited by the order of the blocks, as some blocks can, in accordance with the present invention, occur in different orders and/or concurrently with other blocks from that shown and described herein. Moreover, not all illustrated blocks may be required to implement a methodology in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules can be combined or distributed as desired in various embodiments. Furthermore, computer executable instructions operable to perform the methods described herein can be stored on computer readable media.

FIG. 17 is a flow chart illustrating a method 1700 for processing data in a VPSC. At 1705 general initializations occur. Such initializations include, but are not limited to, allocating memory, establishing pointers, establishing data communications, acquiring resources, instantiating objects, and setting initial values for variables. At 1710, supply chain data is accepted. Such data may come, for example, from one or more supply chain members and may include, but is not limited to, information associated with purchase orders, sales orders, warehouse orders, inventory information, and the like. At 1720, an ownership identifier can be established for the supply chain data accepted at 1710. Such ownership identifier can subsequently be employed in controlling access to such supply chain data. At 1730, access permissions may be established for the supply chain data accepted at 1710. For example, read, write, delete permissions may be established for one or more viewers of the supply chain data. While a first viewer may have read permission, a second viewer may have no permissions, for example.

At 1740, the supply chain data received at 1710 can be transformed into a common format to facilitate storing the data and to further facilitate multiple parties and/or processes viewing the data. For example, data formatted according to a proprietary vendor schema may be converted to conform with a VPSC schema. For example, data may be transformed according to one or more of the schema illustrated in FIGS. 12 through 16. At 1750, the supply chain data may be validated to facilitate controlling the quality of data deposited into a VPSC central data store. For example, data may be validated on parameters including, but not limited to, accuracy, authenticity and corruption. At 1760, the validated supply chain data can be stored in a central VPSC data store, which facilitates viewing the data by members of the VPSC.

At 1770, one or more relationships between supply chain data may be established. For example, a purchase order from a first VPSC member may be related to two sales orders from two different VPSC members. Security and access to the purchase order and sales orders may depend on the relationship between the purchase order and the sales orders. Thus, at 1780, access to the supply chain data stored in the central VPSC data store may be selectively granted, based, for example, on the ownership of the data established at 1720, on the access permissions established at 1730 and/or the relationships established at 1770. At 1790, a determination is made concerning whether there is more data to process. If the determination is NO, then processing can conclude, otherwise processing can return to 1710.

FIG. 18 is a flow chart illustrating a method 1800 for processing data by a generic Internet based viewing engine. At 1805 general initializations occur. Such initializations include, but are not limited to, allocating memory, establishing pointers, establishing data communications, acquiring resources, instantiating objects, and setting initial values for variables.

At 1810, supply chain data is extracted, for example, from one or more supply chain members. Such extraction may be, for example, a full extraction, a partial extraction and/or an update driven extraction. At 1820, the extracted data is transformed to a common format to facilitate storing in a centralized data store and to facilitate viewing by the generic Internet based viewing engine. The common format may, for example, conform with one or more of the schema described in FIGS. 12 through 16. At 1830, the transformed data is validated to determine whether it meets criteria for deposit in the data store(s) accessible by the generic Internet based viewing engine. At 1840, validated data is stored in one or more supply chain data stores accessible to the generic Internet based viewing engine. Metadata (data about data) may be associated with the supply chain data. Such metadata may be employed, for example, to facilitate determining which data should be displayed by a generic Internet based viewing engine and, if displayed, how it should be displayed. Thus, at 1850, metadata associated with the supply chain data is stored in the supply chain data stores accessible to the generic Internet based viewing engine.

At 1860, with the data and the metadata in place, the data may be selectively displayed. Which data is displayed, and how such data is displayed is controlled, at least in part, by the metadata of 1850. For example, a first piece of data may displayed at a first location, in a first font, and in a first color based on metadata associated with the first piece of data while a second piece of data may be displayed at a second location, in a second font and in a second color based on metadata associated with the second piece of data. By associating metadata with the supply chain data, the generic Internet based viewing engine can, at 1860, more flexibly display data, where such flexibility does not require reprogramming of the display engine, providing advantages over conventional systems. At 1870, a determination is made concerning whether there is more data to process. If the determination is NO, then processing can conclude, otherwise processing can return to 1810.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A virtual private supply chain computer system as between two or more supply chain members, comprising:
    a data acceptor operable to receive one or more supply chain data items from one or more supply chain members;
    a supply chain data store operable to store one or more supply chain data items received from one or more supply chain members storing the supply chain data items to conformed supply chain data with one or more common schema;
    a viewing component for displaying the one or more supply chain data items from one or more supply chain members selectively viewing data relating to transactions between the supply chain members;
    a data accessor operable to implement row-level supply chain security to selectively present one or more supply chain data items stored in the supply chain data store to one or more viewing supply chain members selectively permitting access to the conformed supply chain data based on the row-level security applied to the conformed supply chain data; and
    a component that establishes one or more relationships within the supply chain data store between a first supply chain data item originating from a first supply chain member and one or more second supply chain items originating from one or more second supply chain members, the relationships within the supply chain data store being used with the data accessor and the viewing component to prevent the first supply chain member from viewing a row of data originating from the one or more second supply chain members.

2. The virtual private supply chain of claim 1 where an ownership identifier is established within the supply chain data store for one or more supply chain data items.

3. The virtual private supply chain of claim 2 where the supply chain data store is further adapted to facilitate establishing one or more access rights to supply chain data items.

4. The virtual private supply chain of claim 3 where the data acceptor is further adapted to transform the received supply chain data formatted according to a proprietary vendor schema converted to a virtual private supply chain (VPSC) schema to conform with one or more supply chain schema to facilitate collaborative, real-time exchange of supply chain data between multiple enterprises.

5. The virtual private supply chain of claim 4 where the data acceptor is further adapted to validate the transformed supply chain data.

6. The virtual private supply chain of claim 5 where the data acceptor is further adapted to load the validated supply chain data into the supply chain data store.

7. The virtual private supply chain of claim 1 where the data accessor implements the row-level supply chain security to prevent the first supply chain member from viewing a row of data originating from the one or more second supply chain members.

8. The virtual private supply chain of claim 7 where the row-level supply chain security employs at least one of menu level security limiting what menus the one of the supply chain members can view, secure socket layers (SSL), digital certificates and encryption.

9. The virtual private supply chain of claim 1 where the one or more supply chain members are configured in a hub and spoke configuration, with the supply chain members located at spokes and at least one of the data acceptor, the data accessor and the supply chain data store located at the hub.

10. The virtual private supply chain of claim 9 where at least one supply chain member implements a connection stream.

11. The virtual private supply chain of claim 10 where the connection stream is adapted to facilitate making communications between the hub and the spoke implementing the connection appear as a stream.

12. The virtual private supply chain of claim 11 where the connection stream is further adapted to facilitate sending, receiving and/or validating BIO's.

13. The virtual supply chain of claim 12 where the connection stream is further adapted to facilitate selecting an encryption level to be applied to data communicated between the hub and the spoke implementing the connection stream.

14. The virtual private supply chain of claim 9 where one or more supply chain data items may be persisted at one or more spokes.

15. The virtual private supply chain of claim 14 where the persisted items are stored as BLOBS (Binary Large Objects).

16. A computer readable storage medium storing computer executable components of a virtual private supply chain comprising:
    a data accepting component operable to receive one or more supply chain data items from one or more supply chain members;
    a supply chain data storing component operable to facilitate storing of one or more supply chain data items received from one or more supply chain members and storing the supply chain data items to conformed supply chain data with one or more common schema;

a viewing component for displaying the one or more supply chain data items from one or more supply chain members selectively viewing data relating to transactions between the supply chain members;

a data accessing component operable to implement row-level supply chain security to selectively present one or more supply chain data items stored by the supply chain data storing component to one or more viewing supply chain members selectively permitting access to the conformed supply chain data based on the row-level security applied to the conformed supply chain data; and a supply chain data storing component operable to establish one or more relationships within the supply chain data store between a first supply chain data item originating from a first supply chain member and one or more second supply chain data items originating from one or more second supply chain members, the relationships within the supply chain data store being used with the data accessing and viewing components to prevent the first supply chain member from viewing a row of data originating from the one or more second supply chain members.

17. A computer implemented method for providing a virtual private supply chain between two or more supply chain members using a computer readable storage medium storing computer executable acts, the method comprising the following computer executable acts:

centralizing supply chain data from a plurality of supply chain members;

conforming the supply chain data to one or more common schema;

displaying the one or more supply chain data items from one or more supply chain members selectively viewing data relating to transactions between the supply chain members;

selectively permitting access to the conformed supply chain data based on row-level security applied to the conformed supply chain data; and establishing one or more relationships within the supply chain data store between a first supply chain data item originating from a first supply chain member and one or more second supply chain data items originating from one or more second supply chain members, the relationships between the supply chain data items being used with the displaying and the selectively permitting access steps to prevent the first supply chain member from viewing a row of data originating from the one or more second supply chain members.

18. A computer implemented method for providing a virtual private supply chain between two or more supply chain members using a computer readable storage medium storing computer executable acts, the method comprising the following computer executable acts:

accepting one or one or more supply chain data items from one or more supply chain members;

establishing one or more ownership identifiers for the supply chain data items;

establishing one or more access permissions for the supply chain data items;

transforming the supply chain data items to conform with one or more supply chain schema;

displaying the one or more supply chain data items from one or more supply chain members selectively viewing data relating to transactions between the supply chain members;

validating the transformed supply chain data items;

storing the validated supply chain data items in a supply chain data store;

establishing one or more relationships within the supply chain data store between supply chain data items received from two or more supply chain members; and selectively permitting access to one or more supply chain data items based on at least one of the ownership of the supply chain data item, the one or more relationships associated with the supply chain data items, and the one or more access permissions associated with the supply chain data items, said ownership, said relationships, or said access permissions associated with the supply chain data items being used with said viewing step to prevent a supply chain member from viewing a row of data originating from the one or more other supply chain member of the two or more supply chain members.

19. A computer readable storage medium storing computer executable instructions operable to perform the method of claim 18.

20. A computer implemented method for providing a virtual private supply chain between two or more supply chain members using a computer readable storage medium storing computer executable acts, the method comprising the following computer executable acts:

collecting supply chain data from a plurality of supply chain members;

standardizing the collected supply chain data to one or more supply chain schema;

displaying the one or more supply chain data items from one or more supply chain members selectively viewing data relating to transactions between the supply chain members;

securely accessing the collected supply chain data; and establishing within a supply chain data store one or more relationships between a first supply chain data item originating from a first supply chain member and one or more second supply chain data items originating from one or more second supply chain members, the relationships between the supply chain data items being used with the step of displaying and the step of securely accessing the collected supply chain data to prevent the first supply chain member from viewing a row of data originating from the one or more second supply chain members.

* * * * *

UNITED STATES PATENT AND TRADEMARK OFFICE
CERTIFICATE OF CORRECTION

| | | |
|---|---|---|
| PATENT NO. | : 7,571,166 B1 | Page 1 of 1 |
| APPLICATION NO. | : 09/998613 | |
| DATED | : August 4, 2009 | |
| INVENTOR(S) | : Davies et al. | |

It is certified that error appears in the above-identified patent and that said Letters Patent is hereby corrected as shown below:

On the cover page,

[*] Notice:   Subject to any disclaimer, the term of this patent is extended or adjusted under 35 USC 154(b) by (753) days Delete the phrase "by 753 days" and insert -- by 949 days --

Signed and Sealed this

Tenth Day of August, 2010

David J. Kappos
*Director of the United States Patent and Trademark Office*